(12) United States Patent
Kembel et al.

(10) Patent No.: US 8,020,083 B1
(45) Date of Patent: *Sep. 13, 2011

(54) SYSTEM AND METHODS FOR CREATING AND AUTHORING INTERNET CONTENT USING APPLICATION MEDIA PACKAGES

(75) Inventors: John Albert Kembel, Palo Alto, CA (US); George Andrew Kembel, Menlo Park, CA (US); Daniel Kim, Palo Alto, CA (US); John Russell, Palo Alto, CA (US); Jake Wobbrock, Palo Alto, CA (US); Geoffrey Kembel, Menlo Park, CA (US); Jeremy Kembel, Palo Alto, CA (US); Joseph Bella, San Francisco, CA (US); Sridhar Devulkar, Mountain View, CA (US); Mark Wallin, Mountain View, CA (US)

(73) Assignee: Mainstream Scientific, LLC, Mountain View, CA (US)

( * ) Notice: Subject to any disclaimer, the term of this patent is extended or adjusted under 35 U.S.C. 154(b) by 938 days.

This patent is subject to a terminal disclaimer.

(21) Appl. No.: 11/932,585

(22) Filed: Oct. 31, 2007

Related U.S. Application Data

(63) Continuation of application No. 09/558,922, filed on Apr. 26, 2000, now Pat. No. 7,756,967.

(51) Int. Cl.
*G06F 17/00* (2006.01)
*G06F 15/173* (2006.01)
(52) U.S. Cl. ......... 715/201; 715/741; 715/762; 709/224
(58) Field of Classification Search .................. 709/203, 709/223, 224; 715/201, 741, 762
See application file for complete search history.

(56) References Cited

U.S. PATENT DOCUMENTS

| | | |
|---|---|---|
| 5,625,781 A | 4/1997 | Cline et al. |
| 5,649,186 A | 7/1997 | Ferguson |
| 5,740,549 A | 4/1998 | Reilly et al. |
| 5,761,662 A | 6/1998 | Dasan |

(Continued)

FOREIGN PATENT DOCUMENTS

WO WO0180086 A2 10/2001

OTHER PUBLICATIONS

Alexa 1.4.1 Support Pages, 9 pages, www.alexa.com/support/index1.html, Jan. 1999.

(Continued)

*Primary Examiner* — Chau Nguyen
(74) *Attorney, Agent, or Firm* — Pillsbury Winthrop Shaw Pittman, LLP

(57) ABSTRACT

An Application Media Package is a software component for accessing and displaying Internet content which includes a definition for rendering a graphical user interface and a URL pointing to Internet content to be downloaded and presented within said user interface. An Application Media Viewer may be used in association with an Application Media Package to manage the collection, organization, sharing, and rendering of a plurality of such Packages. A development server supports the community of Application Media Package developers, providing developer tools, including Package templates which provide an expedient method of re-purposing existing internet media into a new presentation package by choosing from existing examples. Access to tools and information may be controlled at the development server. The development server may also provide a development and test zone for Package verification, authentication and acceptance before posting.

16 Claims, 14 Drawing Sheets

U.S. PATENT DOCUMENTS

| | | | |
|---|---|---|---|
| 5,794,230 | A | 8/1998 | Horadan et al. |
| 5,796,393 | A | 8/1998 | MacNaughton et al. |
| 5,796,952 | A | 8/1998 | Davis et al. |
| 5,801,702 | A | 9/1998 | Dolan et al. |
| 5,809,248 | A | 9/1998 | Vidovic |
| 5,838,906 | A | 11/1998 | Doyle et al. |
| 5,890,172 | A | 3/1999 | Borman et al. |
| 5,893,091 | A | 4/1999 | Hunt et al. |
| 5,948,061 | A | 9/1999 | Merriman et al. |
| 5,974,446 | A | 10/1999 | Sonnenreich et al. |
| 5,977,964 | A | 11/1999 | Williams et al. |
| 5,983,227 | A | 11/1999 | Nazem et al. |
| 5,987,513 | A | 11/1999 | Prithviraj et al. |
| 5,995,756 | A | 11/1999 | Hermann |
| 6,006,252 | A | 12/1999 | Wolfe |
| 6,012,090 | A | 1/2000 | Chung et al. |
| 6,012,098 | A | 1/2000 | Bayeh et al. |
| 6,018,344 | A | 1/2000 | Harada et al. |
| 6,026,433 | A | 2/2000 | D'Arlach et al. |
| 6,065,044 | A | 5/2000 | Ogasawara |
| 6,101,510 | A * | 8/2000 | Stone et al. .................. 715/234 |
| 6,115,040 | A * | 9/2000 | Bladow et al. ............... 715/741 |
| 6,133,916 | A | 10/2000 | Bukszar et al. |
| 6,161,112 | A | 12/2000 | Cragun et al. |
| 6,177,936 | B1 | 1/2001 | Cragun |
| 6,199,082 | B1 | 3/2001 | Ferrel et al. |
| 6,230,173 | B1 | 5/2001 | Ferrel et al. |
| 6,237,030 | B1 | 5/2001 | Adams et al. |
| 6,268,856 | B1 | 7/2001 | Bruck et al. |
| 6,275,854 | B1 | 8/2001 | Himmel et al. |
| 6,292,185 | B1 | 9/2001 | Ko et al. |
| 6,297,819 | B1 | 10/2001 | Furst |
| 6,314,451 | B1 | 11/2001 | Landsman et al. |
| 6,341,305 | B2 | 1/2002 | Wolfe |
| 6,369,840 | B1 * | 4/2002 | Barnett et al. ............... 715/853 |
| 6,393,407 | B1 | 5/2002 | Middleton et al. |
| 6,411,992 | B1 | 6/2002 | Srinivasan et al. |
| 6,418,440 | B1 | 7/2002 | Kuo et al. |
| 6,434,563 | B1 | 8/2002 | Pasquali et al. |
| 6,460,029 | B1 | 10/2002 | Fries et al. |
| 6,484,149 | B1 | 11/2002 | Jammes et al. |
| 6,487,566 | B1 | 11/2002 | Sundaresan |
| 6,496,203 | B1 * | 12/2002 | Beaumont et al. ........... 715/762 |
| 6,537,324 | B1 | 3/2003 | Tabata et al. |
| 6,538,673 | B1 | 3/2003 | Maslov |
| 6,549,612 | B2 | 4/2003 | Gifford et al. |
| 6,560,639 | B1 | 5/2003 | Dan et al. |
| 6,571,245 | B2 | 5/2003 | Huang et al. |
| 6,594,682 | B2 | 7/2003 | Peterson et al. |
| 6,662,341 | B1 * | 12/2003 | Cooper et al. ............... 715/234 |
| 6,751,606 | B1 | 6/2004 | Fries et al. |
| 6,784,900 | B1 | 8/2004 | Dobronsky et al. |
| 6,816,880 | B1 | 11/2004 | Strandberg et al. |
| 6,834,302 | B1 * | 12/2004 | Harvell ........................ 709/224 |
| 6,842,779 | B1 | 1/2005 | Nishizawa |
| 7,107,548 | B2 | 9/2006 | Shafron |
| 7,216,300 | B2 | 5/2007 | Dang |
| 7,356,569 | B1 | 4/2008 | Kembel et al. |
| 2002/0089536 | A1 * | 7/2002 | Dang ........................... 345/749 |
| 2002/0091697 | A1 * | 7/2002 | Huang et al. ................. 707/10 |

OTHER PUBLICATIONS

Alexa general faqs, 4 pages, www.alexa.com/whatisalexa/faq.html#general, Jan. 1999.

"Custom Explorer Bars Give Sites an Edge," 2 pages, www.microsoft.com/Windows/le/IE5/custom.asp, Jan. 1999.

"Flexibility Across the Web," 2 pages, www.microsoft.com/Windows/le/IE5/choice.asp, Jan. 1999.

"Web Accessories Overview," 2 pages, www.microsoft.com/workshop...er/accesory/overview/overiew.asp, Jan. 1999.

"Browser Extensions Overview," 2 pages, www.microsoft.com/workshop/browser/ext/overview/overview.asp, Jan. 1999.

Alexa Technology, 4 pages, www.alexa.com/support/technology.html, Jan. 1999.

"Creating Custom Explorer Bars and Desk Bands," 13 pages, www.microsoft.com/workshop/browser/ext/overview/Bands.asp, Jan. 1999.

Alexa Internet Tour, 1 page, www.alexa.com.whatisalexa/index/html, Jan. 1999.

"Revolutionary Ad Model," Advertise on Alexa, 1 page, www.alexa.com/company/advertise.html, Jan. 1999.

"The Alexa Service Appears on Your Desktop in Its Own Window," 1 page, www.alexa.com/tour/overview.html, Jan. 1999.

"Know More About the Sites You Visit," 1 page, www.alexa.com/tour/site_stats.html, Jan. 1999.

"Find Related Web Sites," 1 page, www.alexa.com/tour/related_links.html, Jan. 1999.

500,000 Sites and Growing,: 1 page, www.alexa.com/tour/archive.html, Jan. 1999.

"Research Tools at Your Fingertips," 1 page, www.alexa.com/tour/eb.html, Jan. 1999.

"Reporting," 1 page, www.alexa.com/company/reporting.html, Jan. 1999.

"Alexa Internet's Related Links Integrated Into Netscape Browser," 1 page, www.alexa.com/company/netscape.html, Jan. 1999.

"Demographics," alexa.com/company/demographics.html, Jan. 1999.

"Ads Appear in the Pop-up and on the Bar," 1 page, www.alexa.com/company/adspecs.html, Jan. 1999.

"Alexa Why Crawl," 1 page, www.alexa.com/support/why_crawl.html, Jan. 1999.

GIF Image 590x329 pixels, Alexa, 1 page, www.alexa.com/tour/images/alexa_overview.gif, Jan. 1999.

"It's X-treme!," Alexa, PC Magazine: The Best of 1998, 1 page, www.zdnet.com/pcmag/special/bestof98/internet5.html, Jan. 1999.

"Search While You Surf," PC Magazine: Search the Web, 1 page, www.zdnet.com/pcmag/features/websearch98/surf.html, Jan. 1999.

MindSpring, MyYahoo, pp. 1-16, www.mindspring.com/myyahoo/contents.htm, Dec. 1997.

Morrison, XML Unleashed, Sams Publishing, Dec. 21, 1999.

Flanagan, JavaScript; The Definitive Guide, 3rd Ed., O'Reilly, Jun. 1998.

* cited by examiner

SYSTEM AND METHODS FOR CREATING AND AUTHORING INTERNET CONTENT USING APPLICATION MEDIA PACKAGES

CROSS-REFERENCE TO RELATED APPLICATIONS

The present application is a continuation of and incorporates by reference U.S. Non-Provisional patent application Ser. No. 09/558,922, filed Apr. 26, 2000, which claims priority from and incorporates by reference U.S. Provisional Application ser. Nos. 60/131,083, filed Apr. 26, 1999, 60/131,114, filed Apr. 26, 1999, 60/131,115, filed Apr. 26, 1999, 60/176,687, filed Jan. 18, 2000, and 60/176,699, filed Jan. 18, 2000. The present application claims priority to U.S. Non-Provisional patent application Ser. No. 09/558,925, filed Apr. 26, 2000 and each of the aforementioned applications to which it claims priority.

The present application is also related to and incorporates by reference the following U.S. patent applications: Non-Provisional application Ser. No. 09/558,923, filed Apr. 26, 2000; Non-Provisional application Ser. No. 09/558,924, filed Apr. 26, 2000; Non-Provisional application Ser. No. 09/558,925, filed Apr. 26, 2000; Non-Provisional application Ser. No. 11/932,286; filed Oct. 31, 2007, titled "Component For Accessing And Displaying Internet Content"; Non-Provisional application Ser. No. 11/932,340, filed Oct. 31, 2007, titled "Server Including Components For Accessing And Displaying Internet Content And For Providing Same To A Client"; Non-Provisional application Ser. No. 11/932,392; filed Oct. 31, 2007, titled "Method For Accessing And Displaying Internet Content"; Non-Provisional application Ser. No. 11/932,427, filed Oct. 31, 2007, titled "Component For Coordinating The Accessing And Rendering Of An Application Media Package"; Non-Provisional application Ser. No. 11/932,456, filed Oct. 31, 2007, titled "Tracking and Tracing User Activity with Application Media Packages"; Non-Provisional application Ser. No. 11/932,553, filed Oct. 31, 2007, titled "Displaying Time-varying Internet based Data using Media Application Packages"; Non-Provisional application Ser. No. 11/932,630, filed Oct. 31, 2007, titled "Methods of Obtaining Application Media Packages"; Non-Provisional application Ser. No. 11/932,663, filed Oct. 31, 2007, titled "Indexing, Sorting, and Categorizing Dots"; Non-Provisional application Ser. No. 11/932,692, filed Oct. 31, 2007, titled "System and Methods of Messaging between Application Media Packages"; and, Non-Provisional application Ser. No. 11/932,763, filed Oct. 31, 2007, titled "Component For Accessing And Displaying Internet Content In Association With a Web Browser Application".

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent fie or records, but otherwise reserves all copyright rights whatsoever.

BACKGROUND OF THE INVENTION

1. Field of the Invention

The present invention is related to accessing and viewing Internet content, and more specifically to a method and apparatus for providing a unique frame, independent of a Web Browser application and window, for the retrieval and display of such content.

2. Description of the Prior Art

A user operating a client computer typically accesses the Internet by using a viewer application, such as a browser to view Internet content provided at a destination address, typically a web page. In this context, Internet content and web applications are designed to fill the entire web page. It is known to divide the Internet content into different regions of a single web page. For example, personalized web pages can be specified, such that a user views a variety of content sources in a single page, such as stock information, weather information, and sports information, which is aggregated at the server that delivers the web page to the user, who then views the aggregated content in a single web page. Observe that even when disparate content is aggregated, in this manner, it is reassembled into a full web page and is served through a full-screen browser.

Users and application developers therefore have limited control over the presentation of internet content: content is typically trapped within the frame of the browser. A developer's only alternative to engaging a user page-by-page in a browser is to develop, distribute, and support custom client software. In the Web browser scenario, it is the content provider, not the user that aggregates the information that is viewed by the user. Thus, the user is not in a position to separately aggregate the content at a client computer, instead the user is constrained to view the content that has been delivered in the manner provided by the server computer hosting the web page. There is a growing desire for individual users to fully control the aggregation and presentation of content and web applications that appears on a client computer.

A user who wishes to view multiple web pages or applications can open multiple instances of a browser. However, the user will not be able to view each "full-screen" page at the same time. Instead, the user must adjust the windows corresponding to each browser instance and view only part of each page. The information appearing in each browser is not designed for viewing in this manner. Thus, the user cannot create an optimized display of content from multiple sources.

Currently, content providers and end users have limited tools to alter the browser in which content appears. That is, the controls associated with a browser are not fully configurable. Thus, the vendor of a browser is in a position to brand the browser and regulate the controls associated with the browser. There is a growing desire for content providers to not only fill a browser with their content, but to also fully brand and control the frame in which the content appears. Further, in some instances, content providers desire to limit the controls associated with a browser or viewer, so that a user is more inclined to view a single set of content, for example, by having limited access to previously viewed content. However, the current browser applications provide very limited control to a user or content provide to alter the frame and controls provided by the browser window.

In summary, therefore, the current model of the Internet has the following attributes and limitations:

a) Internet content is typically viewed one page at a time, with each page displayed serially displayed in a browser application window which typically takes up the majority of the user's computer screen real estate.

b) Internet content is designed for delivery in web pages. Even if content is modularized, it is reassembled into a full web page and viewed serially in the window of browser application taking up a significant portion of the user's desktop.

c) There is a distinction both visually and architecturally between the "viewer application" (browser) and the "content/document" (web page) such that a browser window is not tailored to the content being displayed, but rather is capable of displaying any web content.

d) Internet content is effectively limited and trapped within the "frame" of the browser (viewer application). Therefore, content developers, users and web-application developers are limited in how the user experience is controlled.

e) Although internet programming technologies (such as Java script, CSS, layers, flash, etc.) are giving web pages more functionality, the pages have limited access to application functionality such as access and control of the window and frame, the size of the frame, branding, application behavior such as size and menu items, etc.

f) "Web-applications" such as web-mail and web calendars are being packaged and viewed through the page-by-page web model. Even though web-applications are being implemented by many online companies, the web is currently a destination page-based model where, for example, a user visits one page, then goes to another page and so on. It is therefore a sequential, linear experience, e.g., one full page at a time.

In view of the foregoing, there is a need in the art to provide a technique for accessing multiple instances of distributable computer readable web content in which these instances are typically smaller than the full pages used in current web pages and web applications, and which may be displayed in user- or content provider-controlled frames. Preferably, such techniques allow such access to be done simultaneously. There is a further need for providing the user with flexibility in selecting, collecting, relating and viewing such web content and for giving the content provider flexibility in directing media to a specific user and controlling the framework in which media, such as web content, is presented. Finally, there is a need to gather more accurate information regarding the type of content that a user enjoys, so that the user can be automatically provided with this content.

SUMMARY OF THE INVENTION

The present invention is directed to systems and methods by which internet content may be authored and distributed. The invention provides for a structure defined herein as an Application Media Package. Application Media Packages are web browser-readable code that is executed on a non-browser-based installed client application. The client application, referred to herein as an Application Media Viewer or Home Dot, executes independently from a web browser. The Application Media Viewer parses and executes the Application Media Package code to create the user experience. The terms Application Media Package and Dot are use synonymously herein.

In addition to the Home Dot, the Dot Server provides a central collection and distribution point for Dot related data. The Dot server is communicated to directly by the Home Dot application, by Dot users, and by third party Dot developers. Internet content that is referenced within a Dot may or may not reside on the Dot server. In general, it does not.

The Dot server supports the community of Dot developers, providing developer tools, including Dot template which provide an expedient method of re-purposing existing internet media into a new presentation package by choosing from existing examples.

The Dot server supports posting and categorization methods for Dot developers to place their Dots in a manner that is effective for Dot users, a manner that promotes Dot developers, a manner that generates revenue by preferential placement of Dots, etc. The Dot server supports developer accounts. These accounts may control access to tools and information as well as provide a development and test zone for Dot verification, authentication and acceptance before posting.

According to the present invention, the Dot is supported by a flat file format that enables a simple file download process that is completed by the Home Dot. The flat file format may be zipped and may also include a method that protects the contents of the Dot from source level viewing. Decoding and parsing is executed by the Home Dot.

In one embodiment, the present invention provides for standard or base controls that are common to all Dots. These controls include size and placement for title bar, exit button, resize button, and menu button. In addition, standard images or content are provided as a default for each of these controls.

According to the present invention, each Dot developer is provided with a unique developer ID by which all of his Dots is identified. Dots may also have a unique Dot ID, a Dot kind (or type attribute), and category.

The above is a summary of a number of the unique aspects, features, and advantages of the present invention. However, this summary is not exhaustive. Thus, these and other aspects, features, and advantages of the present invention will become more apparent from the following detailed description and the appended drawings, when considered in light of the claims provided herein.

BRIEF DESCRIPTION OF THE DRAWINGS

In the drawings appended hereto like reference numerals denote like elements between the various drawings. While illustrative, the drawings are not drawn to scale. In the drawings.

DETAILED DESCRIPTION OF THE INVENTION

The present invention discloses a technology that is capable of processing distributable computer readable media. Distributable computer readable media includes, but is not limited to, standard Internet content, such as HTML, dHTML, images, imbedded ActiveX and Java applications, JavaScript, CSS, Perl scripts, Streaming Media, and/or Flash. The present invention is advantageous relative to prior art systems and methods because it provides improved mechanisms for simultaneously interacting with several independent sources of distributable computer readable media, collecting references to such media, and sharing such references with other users. The disclosed technology is further advantageous because it provides improved systems and methods for on screen management of distributable computer readable media.

Central to the present invention is the concept of an Application Media Package. As used herein, the term Application Media Package refers to a component which includes a fully configurable frame with one or more controls; the frame through which content is optionally presented. The fully configurable frame utilized in accordance with the invention stands in contrast to present web browsers, which are branded by the browser vendor and which have limited means by which to alter the controls associated with the browser.

Absence of Web Browser

The Application Media Package is a file that is comprised of web browser readable language. According to the preferred embodiment, the present invention renders, displays, and updates Internet data without the use of a browser. In fact, no browser need be installed on the client computer on which the Application Package is instantiated. The present invention produces a user experience by parsing and rendering the Application Media Package through the Application Media Viewer. The Application Media Viewer is an installed client application which renders the Application Media Package as well as provides additional functionality to the user experience (hence, it is more than simply a viewer application). The Application Media Viewer may render web browser readable content (of the type typically supported by a browser application) due to it being programmed utilizing the Microsoft IE4 object for receiving, parsing and rendering web content. It will be understood by one skilled in the art that, despite its name, the Microsoft IE4 object is not a web browser application. One apparent difference between the Application Media Viewer and a typical web browser application is that the Application Media Viewer of the present invention is not designed to provide user web navigation and page control typically provided by a web browser.

Figure 1:
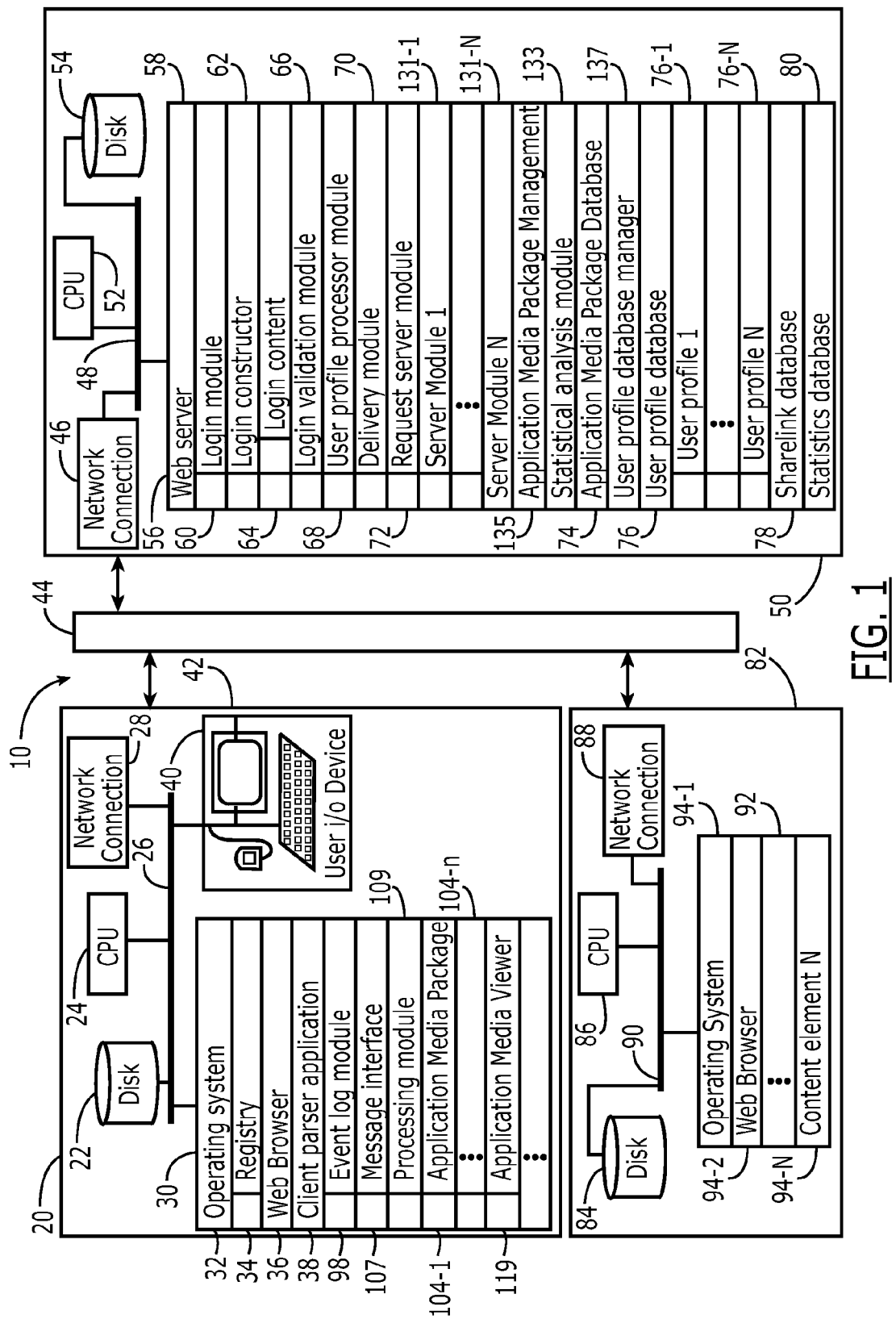
FIG. 1 is an illustration of the overall architecture of a network in which the present invention may operate.

FIG. 1 is a general illustration of a system in accordance with one embodiment of the present invention. In FIG. 1, a network 10 is operated in accordance with the present invention. Network 10 includes at least one user or client computer 20, at least one server computer of class 50, and optionally one or more server computers of class 82. User computer 20 as well as server computers of class 50 and 82 are each connected by transmission channel 44, which is any wired or wireless transmission channel.

User computer 20 is any device that includes a Central Processing Unit (CPU) 24 connected to a random access memory 30, a network connection 28, and one or more user input/output ("i/o") devices 40 including output means 42. Thus, the term "computer," as used herein, is intended in its broadest sense to include not only traditional workstations, laptops and similar devices, but any device containing a CPU of sufficient operability to utilize Internet data, such as web-enable cell phones, personal digital assistants (PDAs), and so forth.

Output means 42 is any device capable of communicating with a user and includes, for example, a video monitor, a liquid crystal display, voice user interfaces, and/or integrated graphic means such as mini-displays present in web-enabled cell phones, PDAs, etc.

Typically, user computer 20 includes a main non-volatile storage unit 22, preferably a hard disk drive, for storing software and data. Further, user computer 20 includes one or more internal buses 26 for interconnecting the aforementioned elements. In a typical embodiment, memory 30 includes an operating system 32 for managing files and programs associated with user computer 20. In some embodiments, operating system 32 includes a registry 34 that has one or more references to specified locations in system 10.

The exemplary memory 30 of FIG. 1 further includes a web browser 36 for viewing Internet content and a separate collection of items, referred to herein as a client parser application 38. In some embodiments, client parser application 38 uses the one or more references in registry 34 to obtain a login construct from server 50. In various embodiments, in accordance with the present invention, client parser application 38 runs in conjunction with one or more software modules, such as an event log module 98, which tracks user activity, a message interface module 107, which serves as a communication interface between the client parser application 38 and web server 58 and/or external web servers, an application media processing module 109, one or more Application Media Packages 104-1 to 104-n, and an Application Media Viewer 119 which, among other functions, regulates the characteristics of visual manifestations of Application Media Packages 104-1 to 104-n when displayed on output device 42.

Server computer 50 includes standard server components, including a network connection device 46, a CPU 52, a main non-volatile storage unit 54, and a random access memory 56. Further, server computer 50 includes one or more internal buses 48 for interconnecting the aforementioned elements. Memory 56 stores a set of computer programs, modules and data to implement the processing associated with the present invention.

The embodiment of memory 56 illustrated in FIG. 1 includes a web server 58 for processing requests received from client computer 20. Web server 58 has many components, including a variety of modules and data structures to assist users that want to log into system 10. Namely, login module 60 handles an entry request from a client computer 20 and accepts a login identifier that corresponds to a user from client computer 20.

Once a user has successfully logged into system 10, request server module 72 handles requests for specified Application Media Packages 104-1 to 104-n from client 20. When such a request is received, request server module 72 routes the request to an address that corresponds to the specified Application Media Packages 104-1 to 104-n and transmits the specified Application Media Packages 104-1 to 104-n to client 20. One class of specified networked information handled by request server module 72 is requests for Application Media Packages 104-1 to 104-n. When such a request is received, request server module 72 searches Application Media Packages database 74 for the specified Application Media Package. Application Media Package templates database 74 includes a large number of Application Media Package templates. Each Application Media Package template defines the characteristics of a specific Application Media Package, including fully configurable frame characteristics, viewer and control characteristics, and Application Media Package content references.

The web server 58 illustrated in FIG. 1 further includes additional modules 131 to handle specialized features of the present invention. For example, one embodiment of the present invention provides a mechanism that allows users to distribute Application Media Packages to each other. In such embodiments, a special server module 131 provides instructions for storing the Application Media Packages, which are to be distributed, using a sharelink database 78. Advantageously, Application Media Packages that are distributed to other users are customizable. A user can, for example, resize and position a particular Application Media Packages prior to sharing it with another user. Indeed, it is possible, in such embodiments, for a user to arrange a series of Application Media Packages in a unique arrangement and then distribute the collection of Application Media Packages in the designated arrangement. As an illustration, a user arranges a first Application Media Package that represents a scrolling stock ticker at the bottom of an output means, such as a computer screen, a second Application Media Package that tracks the NASDAQ top ten most heavily traded stocks in the upper left corner of the output means, and a third Application Media Package that tracks headline news on the upper right hand corner of the output means. Then, the user distributes the three Application Media Packages in this customized arrangement to other users. Observe that in this example a user of a client computer is aggregating separate sets of information in different Application Media Packages. This stands in contrast to prior art approaches where a web server running on a server computer aggregates information in a single page.

System 10 is highly scalable and thus supports a large number of users. This scalability stems from the fact that the server 50 is delivering the definition associated with an Application Media Package. The content displayed in the Application Media Package may be located on a separate computer. Memory 56 may provide a statistical analysis module 133 for tracking key events associated with users. This information is stored in statistics database 80. The information collected by statistical analysis module 133 is used for a wide variety of purposes, including server load optimization and directed advertising, as discussed below. As described below, the statistical information gathered in accordance with the invention includes fully traced events defining the type of content and the duration over which all content is viewed by a user. This type of comprehensive information is not available using present techniques. Much of the distributable computer readable media that is available for processing is stored as content elements 94 on server 82. Server 82 is a standard web server that includes components such as a network connection device 88, a CPU 86, a main non-volatile storage unit 84, a random access memory (RAM) 92, and one or more internal buses 90 for interconnecting the aforementioned elements. RAM 92 includes some of the content elements 94 stored by server 82. Other content elements 94 are stored in storage unit 84. In some embodiments, a single web server 58 is capable of directly accessing content elements 94 located on one or more servers 82. In other embodiments, each server 82 has a resident web server module that works in conjunction with server 50 to identify, optionally dynamically generate, and serve content elements 94 upon demand.

With the general architecture of a system within which the present invention may operate provided with reference to FIG. 1, we next turn to a number of definitions of key terms used herein. Terms not specifically defined herein shall be understood to have their broadest, generally accepted meaning. Other terms may be defined elsewhere in the present disclosure. (See also Appendix A and B herein.)

Application Media Package—An Application Media Package, also referred to herein as a Dot, is computer software component, such as XML code and data, representing the definition of a client-side mini-application, which displays information and/or provides functionality to an end user. The Application Media Package combines the packaging, application behavior, and the presentation of Internet content with the content itself, creating one integrated unit—a Dot. Therefore, Dots are the integration of application and media. A Dot may be viewed as a free-floating mini-site. It is frame in which Internet content is presented (although lacking the most common functionality typically associated with a browser, navigation).

In one embodiment, Dots are programmed with browser readable language that is parsed to the Microsoft Internet Explorer (IE) rendering object (referenced within a control, so named the Dot Web Conduit) and are capable of displaying any Internet content supported by IE 4 (however, not necessarily requiring use of Internet Explorer or any browser for such display). This browser readable language defines the appearance of a Dot, its functionality, and what content is presents. This browser readable language includes XML, streaming media, dHTML, etc.

Structurally, the Dot or media application package comprises initialization data, control calls, and a frame. Content, such as that obtained from a network reference, is rendered within the frame. The control calls may include the web conduit, base controls such as "close" and resize", base GUI elements such as a title bar, Dot menu, and Dot bottom bar, as well as XML Dot calls that are made by the Dot Definition and executed by the Home Dot. Unlike a downloadable, custom, client-application (e.g., for delivering custom web applications to users' desktops), an Application Media Package is entirely content. That is, the entirety of a Dot package, referred to as its definition, is in a browser-readable language.

All that is required to instantiate an Application Media Package (on the client computer) is its definition assuming that the client computer has an Application Media Viewer (discussed below) installed. That is, no browser is needed to render an Application Media Package. No browser need be running or be present on the client machine in order to render an Application Media Package.

Application Media Package Content—Application Media Package content, also referred to as Dot Content, is Internet content served off of partner/Dot Developer servers or another third party server. While in some cases a party developing and making a Dot available (from a partner/Dot Developer server) may also host (on the server) content for that Dot, the developer is free to cause the Dot to point to content from another party/site for rendering as part of an instantiated Dot. It is an attribute of the present invention that any internet content can be accessed, processed, and/or displayed as Dot Content or Application Media Package Content.

Application Media Viewer—The Application Media Viewer, also referred to herein as the Home Dot, is a network enabled, client application that loads and displays an Application Media Package on a client computer. Data contained within the Application Media Package is parsed by the Application Media Viewer and rendered within the extent of the Application Media Package's frame as defined therein. Data is web browser readable language including media and Internet references thereto, as well as control calls. These control calls contained within an Application Media Package are also parsed and executed. The Application Media Viewer is required to instantiate an Application Media Package (i.e., to create a Dot and provide any associated functionality on a client display device). The Application Media Viewer effectively takes the place of a browser application when rendering Internet content via an Application Media Package. However, an Application Media Package contains Internet data and as such, this data may also be referenced by a browser. In the preferred embodiment, a browser is not employed to instantiate an Application Media Package, nor to invoke any functionality they may provide. Also in the preferred embodiment, the Application Media Viewer is a compiled application, programmed using MFC (Microsoft Foundation Class) or the like. The Application Media Viewer need only be downloaded to the client computer one time and may be used to instantiate any number of Application Media Packages. More than one Application Media Package may be instantiated at a time, i.e. the Application Media Viewer is capable of executing and displaying multiple instantiated Application Media Packages. The Application Media Viewer is also capable of checking for updated versions of itself (and any Application Media Package) on the server. The Application Media Viewer supports a number of facilities including support for standard internet protocols (http, https, etc.) Additionally, the Application Media Viewer also supports collecting and organizing Application Media Packages, user login, user activity statistics collecting and reporting, and messaging between Application Media Packages.

Block—A group of Dots. Blocks are created and destroyed by the user through the dragging and positioning of individual Dots or other blocks.

Computer—as used herein, the term computer is meant to refer to any device that includes a Central Processing Unit (CPU) connected to a random access memory, a network connection, connected and rendering to one or more output devices, which has sufficient operability to utilize Internet data, such as web-enable cell phones, personal digital assistants (PDAs), etc. Thus, the term is intended in its broadest sense to include not only traditional workstations, laptops and similar devices, but web-enabled cell phones, PDAs, etc.

Content Server—Also called a Partner Web Server, used to deliver Internet content to a Dot on a client machine.

Controls—A Dot comprises of at least one control, each of which is arranged within the frame according to the Dot Definition. In the preferred embodiment, this minimum control is the Web Conduit which is the Internet data rendering portion of the frame. Controls are calls that are contained within the Dot content that enable a Dot, for example with application behavior amongst other attributes and explained further herein. The Dot Definition may contain base control (close, resize) overrides such that the controls are not rendered or are rendered only upon mouse over events rather than persistent display. Additional media elements and network referenced media may also be contained within the Dot Definition.

DoDots—The working product name of the invention described herein.

Dot Class—An instance of a particular set of binaries to create a particular type of Dot.

Dot Definition—This software entity contains enough information to instantiate an Application Media Package (a Dot) and pointers to location of Application Media Package content (Dot content). A Dot is defined by its dimensions and a set of four attributes called Dot components, as will be later described. A Dot Definition also defines access to Dot Web Conduit, which is a control element of a Dot and is a fully functional rendering element that can access available Internet content.

Dot Link—Hyperlink or URL on a server for downloading a Dot. Based on standard Internet links, these point to or reference particular Dot Definitions and enable the Home Dot to quickly access (using standard HTTP/HTTPS requests, for example) the frame and initialization pointers/URLs in the Dot Definition to instantiate the Dot and render it.

Dot Messaging Architecture (DMA)—Elements within Dots and the Home Dot application create a messaging architecture (the Dot Messaging Architecture) that enables elements of the system including Dots, controls within Dots, and the Home Dot application, to communicate with one another. The DMA enables these elements to exchange information, request actions or functionality, and respond to system, element, or content events.

Dot Pack—A group of Dot templates specified by a particular Dot developer, provider or aggregator that complement each other in some way.

Dot Server—Also called an Internet Application Server, used to deliver Dots to a client machine.

Dot Template—The XML definition of a particular Dot provider's Dot in its default state. Information includes the Dot size, Dot class, starting URL, etc. The Dot template may be defined by a third party Dot provider. The Dot template is used as the starting point for a particular Dot, which may be customized by the user in some way after the first instantiation.

Frame—The frame, also referred to as a Graphical User Interface (GUI), defines that area upon a display of the Dot instantiation in which data may be rendered. As previously described, the frame may contain rendered Internet data. A Dot is comprised of a frame or GUI, initialization input data including data and network references to data displayed in said frame. The appearance of the frame (if any) together with data that is displayed therein is the visible instantiation of the Dot. Any Internet data or media data may be contained within the frame such as an image, Internet content, etc. Additionally the frame shape and content may be wholly defined by the Dot developer.

Lead Dot—The controlling Dot within a block. A lead Dot is the only Dot within a group that presents a control and close box. The lead Dot is the leftmost, topmost Dot (in that order).

Share—A Share is a XML file that represents a collection of one or more

Dots and/or one or more Snapshots.

Snapshot—A point-in-time data set describing an individual user's overall visible Dot configuration. This includes location and configuration information on the user's overall configuration, and all blocks and Dots.

Web Browser Readable Language—standard Internet content that is capable of being parsed by a browser, such content including HTML, Java script, XML, CSS, streaming media, Flash, HTTPS, cookies, etc.

Web Conduit—a control that accesses and renders standard Internet content. Dots in conjunction with the Web Conduit control can render or process anything a browser application can render or process. That is, the web conduit is an entity which processes or handles standard Internet content for rendering the GUI (graphical user interface).

The present invention discloses a technology that is capable of distributing standard Internet content without the use of and restrictions imposed by a browser as detailed hereinabove, in a manner that enables developer control of the user interface. The present invention includes a method and system in which Internet content is developed, packaged and delivered from a server. The present invention further describes methods and systems in which the user obtains content, interacts with it, and is presented with updates to the content either in part or including the entire Application Media Package.

The present invention provides an alternative model of viewing content obtained from the Internet. Unlike the web page model requiring a web browser, the present invention is founded on the premise that the basic unit of the Web and its media should not be limited or restricted to a webpage-based display for presentation in a conventional browser nor should the user's experience of the Web be limited to one page at a time as defined by a conventional browser (such as Microsoft's Internet Explorer™).

Furthermore, the present invention enables efficient placement of web applications directly onto users' desktops. The present invention enables content providers to: break their Internet-based content up into smaller pieces; package this content as Application Media Packages (Dots); give Dots an application behavior through a Dot Messaging Architecture; and to distribute Dots from one user to another (Viral Distribution Architecture).

The ability to break web-based internet content into smaller packages (e.g., Dots) for transfer independent of a conventional browse enables content providers to distribute their media to: fully brand and control a user's experience; obtain direct access to consumers; secure longer on-screen presence; give application-media viral characteristics; and eliminate the need to maintain a software application in order to achieve these characteristics.

With regard to viral characteristics, for example, the present invention allows content providers to enable users to: collect Dots; use Dots in groups (Dot Packs); and share Dots with others. Therefore, Dots are passed from server to user and also from user to user via email links. Not only are may single Dot links be virally distributed, but also collections of Dots and their links may also be virally distributed from user to user. Because Dots reference web data including media, Dots enable the viral distribution of said media although the media may reside on a server.

Software application download is eliminated because Dot content is based on standard Internet content (HTML, dHTML, flash, streaming media, Java, etc.), providing Dots with certain browser-like functionality. By this virtue, Dots may be distributed not as software application downloads but as Internet media downloads, similar to web page downloads. As a Dot may define the frame within which content is to be rendered, the visual extent of a Dot is not bound within the borders of a browser window. Unlike a web page in a third party browser, a Dot's graphical user interface may be wholly defined and/or branded by the developer.

Because Dots are instantiated and rendered upon a client computer as separate and independent graphical user interfaces, and because they may be continuously refreshed with new internet content, Dots may persist on a user's screen. Therefore Dots may possess a longer desktop presence (i.e., remain in place, or "On", while a user attends to other tasks on a device, such as interacting with different applications, making phone calls, etc.

The present invention therefore also allows for persistence of displayed Internet content. For example, a dedicated frame may be rendered on a user's display, Internet content obtained from a server, the obtained Internet content presented in the frame (and possibly periodically updated), and the frame and content positioned and sized such that it may remain, unobtrusively, open on the user's desktop, even when other windows are open. This is fundamentally different than today's model where users visit websites and leave them due to size of the browser window, full use of the content displayed, etc.)

Dots provide Internet content developers and web application developers: a unique way to package their content as custom client application experiences without having to develop, distribute, and support their own custom client application. Developers may repurpose the Internet content that they have developed and used in web pages to form Dots. In doing so, according to the present invention, developers may also add application behavior to Dots such that the user experience includes interactive graphical user interface elements, likened more to a custom desktop client application rather than to a web page. Thus, Dots enable Internet media to posses application behavior without the use of a browser or custom application.

From a Dot provider's perspective, Dots provide direct access to users; and a persistent branded presence on users' desktops beyond and without the browser, thus providing full control of the user's experience. That is, a Dot that is instantiated on a user's client computer has the user's display real estate. Conversely, a web page typically must be navigated to through the use of a web browser each time a user views the web page media, and once the user navigates to a new page, the display space (browser window) effectively belongs to the new web page content. As previously described, the branded experience may be wholly defined by the Dot developer, thus removing the rendering and branding limitations of a web page in a browser. Without the present invention, an alternative available to the Internet content developer is to develop a custom application that must be downloaded each time it is changed or alternate content is desired to be displayed.

In summary, Dots give users a unique way to experience web media by virtue of its: (1) flexible frame definition; and (2) a Dot's persistence when instantiated. Because of their ability to persist on a user's desktop apart from a browser, Dots also provide a convenient method to access content and services (without separate user selection of a URL). With a Dot for each of a user's specific Internet data needs, Dots eliminate the need to download custom software from multiple sites for various content. Rather than implementing custom client applications in Java, C++, etc., Dots are defined using XML and filled with standard Internet content such as HTML, GIFs, and the like.

The present invention also provides for the ability to collect and share favorite content and application-like behavior (i.e., sharing Dots). Links to Dots may be easily emailed between friends. Dots may be collected according to common interest, usage requirements or the like and defined as groups called Dot Packs. These Dot Packs may also be shared as links via email or server.

A fundamental aspect of the present invention is the creation of a Dot, including packaging of Internet content. The goal is to create an Application Media Packages (Dots) which combine the packaging, application behavior, and presentation of Internet content with the content itself (or typically a pointer thereto), as a single integrated unit (a Dot). Therefore, Dots are the integration of application and media.

This is fundamentally different than rendering internet content in a viewer application or alternatively, developing, distributing, and supporting a custom client-side application. Typically, a Dot definition includes details regarding a window "frame," and the Dot content has access to the entirety of this frame. The details regarding the frame is itself Internet content, so that the entire Dot "package" (including the definition of the package) is Internet content. Thus, the Internet content is not trapped in a third party viewer (e.g., Stock Trading site's web page in Microsoft's browser).

Dot content has access to application behaviors of the window frame (size, position, look and feel) and of the Dot application system (show other Dots, delete Dots, etc.) For example, a Dot may change color according to ongoing data updates that it receives over the Internet. A Dot designed to display weather information may become increasingly red as temperature data received for a particular city or region increases.

Furthermore, a Dot may communicate with other Dots. Communication between Dots is typically carried out by two or more Dots that are instantiated on the same client and enabled such that they may participate in inter-Dot communication. In one embodiment, communication is carried out by messages that are passed between Dots via the Home Dot that instantiated them. These messages may pass data, alter controls, or result in behavior change for example. Not only may Dots of the same kind communicate but in one example, Dots formed between different developers may also communicate and affect one another. Such communication may be apparent or may be a background function supporting some aspect of a Dot's functionality.

Dot and Dot Definition

Figure 2:
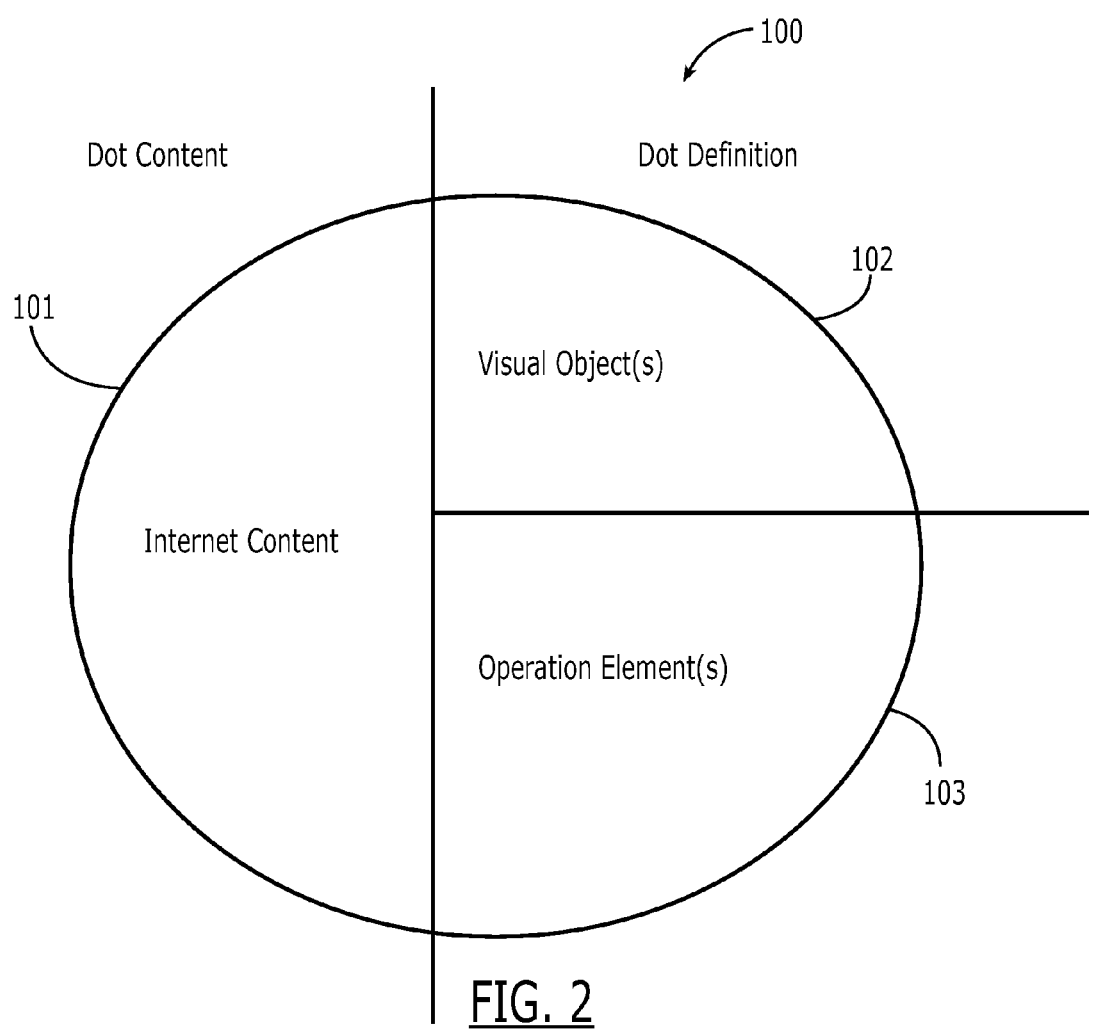
FIG. 2 is an illustration of the elements of an Application Media Package (Dot) according to one embodiment of the present invention.

With the above general description in mind, we now turn to a description of a Dot and its definition. With reference to FIG. 2, the primary components of a Dot 100 are: Internet content 101, a visual object(s) 102 within which the Internet Content 101 may be rendered, and operation element(s) 103, which perform certain functions, each discussed further below.

Figure 3:
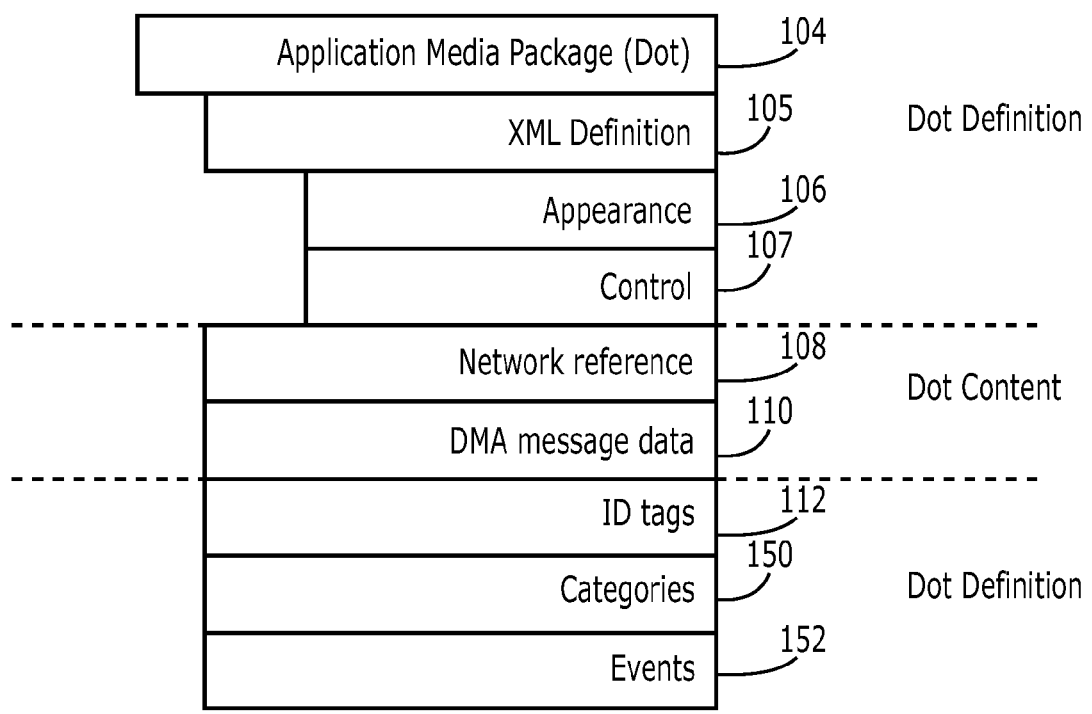
FIG. 3 is an illustration of the elements of an Application Media Package (Dot) definition according to one embodiment of the present invention.

A Dot 100 is an instantiation of a Dot Definition 104, the components of which are illustrated in FIG. 3. At its broadest, Dot Definition 104 comprises an XML (or similar) definition 105 (which may include initialization data, control calls, and a frame definition, discussed further below) and a Network Reference 108 (e.g., a URL) to Internet content 101. (See, for example, Appendix A—DoDots XML Specification.)

XML definition 105 includes an appearance definition 106 for defining the appearance of a GUI (discussed further below), and a control definition 107 for defining controls associated with the GUI. Definitions 106 and 107 will typically include initialization data, control calls, and other elements. Optionally, a Dot may include message data 110 (e.g., access to the Dot Messaging Architecture). Application Media Package 104 (or "Dot Definition") may also include tags 112 to identify the Dot.

Figure 4:
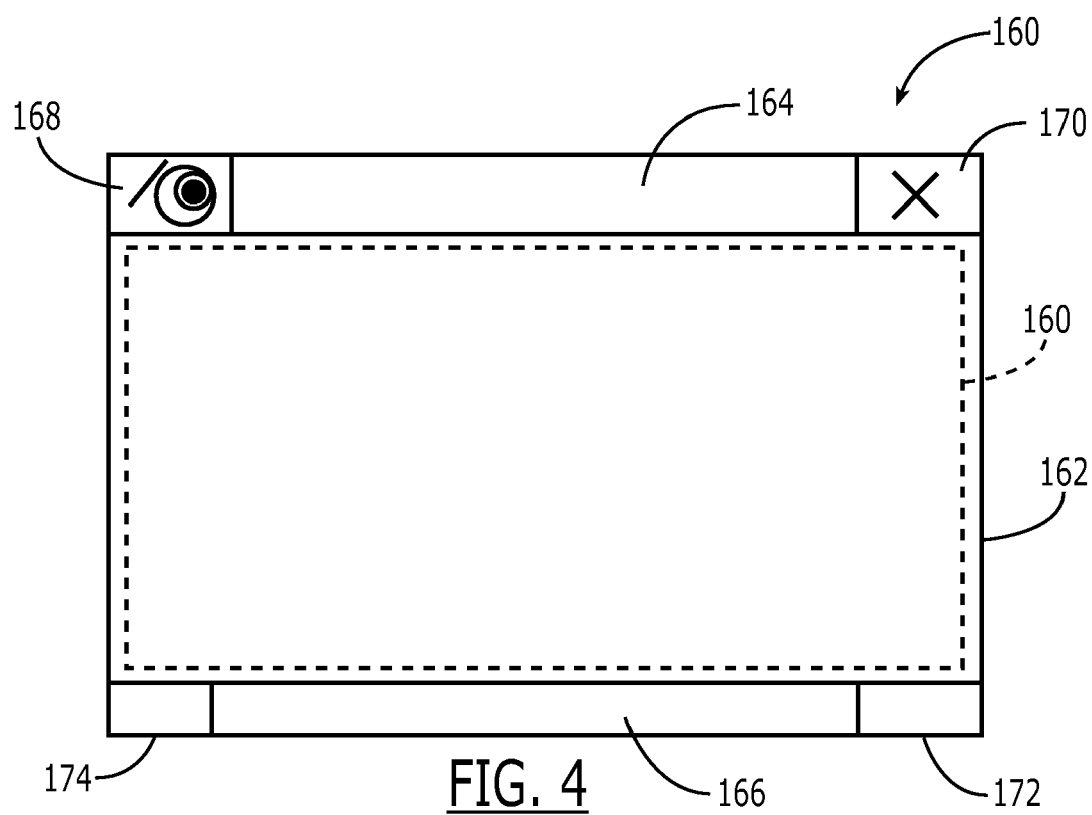
FIG. 4 is an illustration of an instantiation of a generic GUI according to one embodiment of the present invention.

The XML definition 106 of the appearance of the GUI typically includes a frame definition, specifying size, location, etc. FIG. 4 is an illustration of an instantiation of a generic GUI 160, which comprises a frame 162 typically divided into a number of control regions. For example, Frame 162 may include a title bar 164, a bottom bar 166, a menu control region 168, and other definable control regions 170, 172, and 174. One critical control region, referred to herein as the Web Conduit 176, is a regions in which many Dots will present Internet content. Returning to FIG. 3, definition 106 is responsible for providing the dimensions and general shape of the GUI.

The control definition 107 defines the layout (arrangement of the controls) and functional routines or pointers to functional routines (what the controls do when accessed by a user). Control definition 107 may also include XML Dot calls that are made by the Dot Definition and executed by the Home Dot (not shown here).

Network reference 108 will typically be a URL containing the address of a server having stored thereon data (Internet content) for retrieval and display within the GUI. Functionality typically provided by an associated Application Media Viewer controls the accessing of the server at the URL and the retrieval and processing of the Internet content for display. Importantly, retrieval and display of the Internet content may take place without resort to a Web browser application. Indeed, no Web browser application need be executing or even present on the client to support the Dot functionality (although embodiments in which Dot functionality is operational in conjunction with browser functionality is within the scope of the present invention). Internet content obtained from network reference 108 may be rendered within the frame defined by and according to the layout definition dictated by the frame appearance definition 106. Internet content obtained from reference 108 may itself include XML calls providing certain functionality.

As previously mentioned, Dot Definition 104 is typically XML code. These definitions are quite simple to author, and to edit if needed. The definition is content, rather than compiled code, which provides additional flexibility at the client side should it be desired to modify the definition (e.g., allow a user to edit the network reference). As will be described further below, when an Application Media Viewer is operating on the client computer, the Dot is effectively both content and instructions. This is therefore a method of packaging internet content as an application (as compared to a hard coded custom client application) for operation on Internet content.

Figure 5:
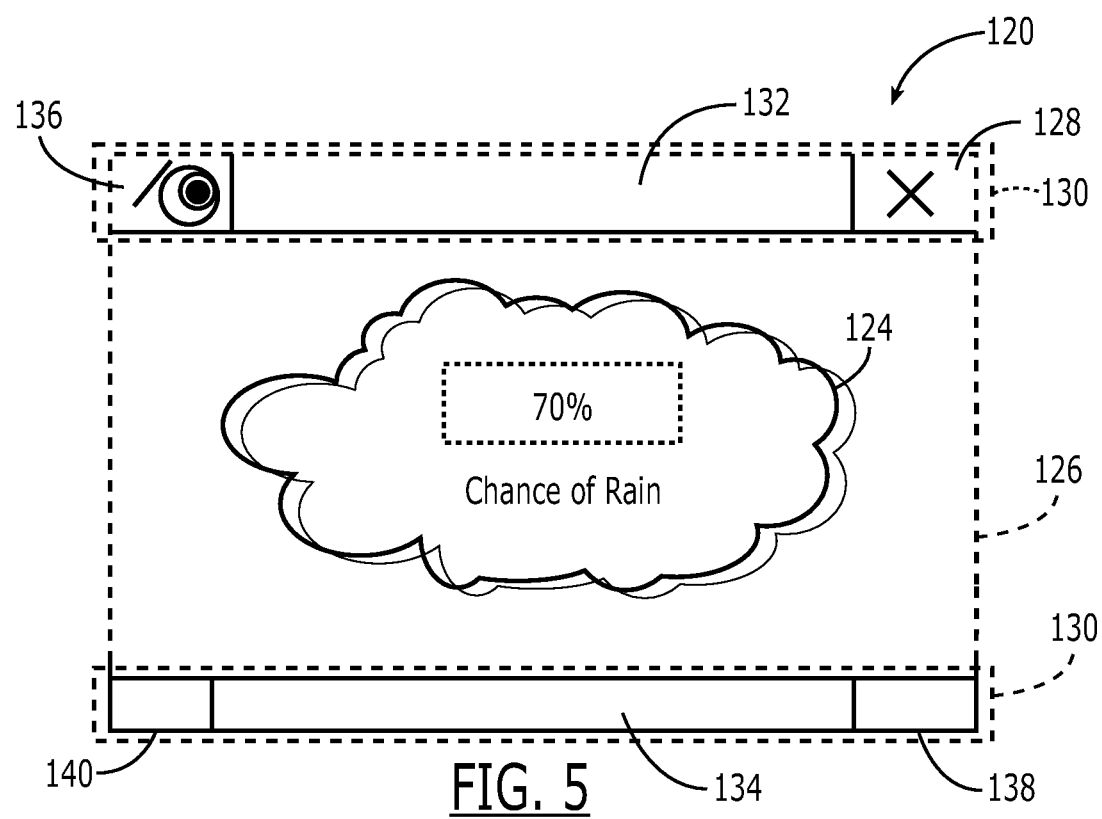
FIG. 5 is an example of an instance of an Application Media Package (Dot) according to one embodiment of the present invention.

FIG. 5 illustrates a rendering or instantiation of a Dot Definition as a Dot 120, in this case a visual indicator of likelihood of rain, expressed as a percentage 122, and rendered against an image of a cloud 124. According to the above, a definition for Dot 120 includes a definition of the size, configuration, and location of a first control space 126, a specification of the layout and functionality of control interfaces (or simply controls) located in a second control space 130. Examples of such controls include a "close" button, a "resize" handle, etc.

The image of a cloud 124 against which the likelihood of rain is rendered is a static image. The data representing the instructions for rendering the cloud may be found in the appearance definition 106, and thus resides within the Dot Definition 104. Alternatively, the data representing the image of the cloud 124 may be obtained from the location to which network reference 108 points. In either case, the data representing the cloud is utilized by the Application Media Viewer 104 to render the cloud image.

The actual data representing the likelihood of rain may be standard Internet content, and will change periodically as controlled by the source (e.g., the Internet content itself obtained from a server at network reference 108) of the data. Since this data changes as controlled by the source, the data is considered dynamic. This dynamic data is obtained by the Application Media Viewer from the source, and rendered atop the static image of the cloud. The frequency of updating and re-rendering of the dynamic data may be under the control of the Dot Definition or the source of the data, as a developer deems appropriate. The data to be rendered with the image may for example overlay, or be rendered in a layer on top of the image, beside the image, in the same layer or otherwise, in a layer under the image layer, etc. However, there is generally an intended relationship between the position of rendered Internet content and other items rendered in the graphical user interface. For this reason, we say that the Internet content is rendered "in association with" the image within the graphical user interface.

It will be appreciated that Dot 120 is merely on illustration of a Dot, and many other types of content, format, layout, controls, functionality, etc. are contemplated by the present invention. For example, additional display of information and/or control may also be presented in top/bottom bars 132, 134, respectively, as will be understood by one skilled in the art.

Thus, a Dot is defined using, for example, an XML file which is the embodiment of a Dot Definition 104. The definition contains enough information that, when instantiated, the Dot may be rendered and filled with Internet content from a source. The Dot Definition contains data used to define and configure a frame and its elements, specify and lay out the controls, and specify parameters that initialize all the Dot's components with content and data.

Frame Definition

A frame can be defined to have a configuration (e.g., base shape), size (e.g., dimensions), and initial location (which may be changed by a user upon instantiation). In additional, a simple Dot may be defined to have four default functional frame definition controls, for example to encourage user interface consistency between different Dots. These four default functional controls include a title bar 132 (Gif rendered with title bar properties), a Dot menu 136 (with flexible menu entries), an exit control 128, and a bottom bar 124 (Gif rendered with bottom bar properties) with corner elements 138, 140 (for sizing and consistent user interface). A default layout of these functional components may be set, such as positions for the title bar 132 at the top of a Dot (Dot Menu 130 on its left, exit control 128 on its right) and the bottom bar 134 at the bottom of a Dot (with corner elements on either side). It will be appreciated that this is one form of layout, of which many others are within contemplated within the scope of the present invention.

Title Bar

The title bar 132 may contain a reference title for the Dot and may provide for a place for a user to grab and drag the Dot in a windowed environment. It may be implemented as a GIF rendering control that can be targeted to a local/remote title bar 132 image (an embodiment supports four title bar images—normal, mouse-down, mouse-over or hover, inactive). In this embodiment, the title bar 132 has a fixed height and width that is a function of the frame's width. The Dot Definition allows the title bar 132 image to be justified left, right, or center and for specified number of repeat-pixels, the title bar image may be tiled the full width of the Dot. Overlay text can also be specified to layer on top of the title bar 132 image.

The default size and the default position of the Dot are defined as part of the appearance definition 106 in the Dot Definition 104. The Dot size can be specified in pixels, or Dot Units (1 Dot Unit is 40 pixels), etc. Dot Units can define a grid that keeps Dots sized on the same units so that they more easily and neatly align as well as cleanly snap to each other when Dots are used together. Dots can be sizeable or fixed-size in either dimension or both. The default screen position for a Dot can also be specified in pixels, or in relative position—top, left, center as provided for in the appearance definition 106 in the Dot Definition 104.

Menus

One embodiment of the present invention reserves the four corners of a Dot for functional branding elements. The upper left corner is currently reserved for the menu control 136. The upper right corner is currently reserved for the Dot exit 128 control. The lower corners 138, 140 are for sizing the Dot if the Dot is resizable. Menu entries for branded menu control 136 (upper-left) can be specified in the Dot Definition 104, for example at 112. The menu items can be named, assigned images and tooltips, and assigned a specific and targeted action, for example a DotMessage 110 sent to a specified element (address). (See DMA messages hereinbelow). The Dot exit 128 button (upper-right) closes the Dot. An on-close action (such as a message and address pair) can be assigned to the Dot close event.

Bottom Bar

The bottom bar 134 may be implemented much like the title bar 132, including supporting text overlay and additional functionality. (See Appendix A—DoDots XML Specification for a list of controls with XML call and their definitions)

Alternative Embodiments for Controls

Dots may be defined so as not to require a rectangular title bar 132 or bottom bar 134 (at top and bottom). Indeed, either or both of title bar 132 and bottom bar 134 may be omitted in a Dot Definition. Other controls (128, 130, 138, 140) may also be omitted, provided certain functionality (e.g., exit or close) is otherwise provided. Furthermore, every functional element in a Dot may be defined as a control element that is relatively positioned and layered (in z order)—much like layers in HTML. Transparency may also be a given property. Different layers and controls may be given Dot properties (such as a title-bar-move-property or Dot-menu-property). Very flexible Dot interfaces may therefore be provided. (See the specification for the <DOT> and <CONTROL>DTDs in Appendix A—XML Specification.)

Control Space

Between the title bar 132 and the bottom bar 134 is a control space 126 where one or more controls, images, data, etc., can be flexibly positioned. For example, control space 126 may include a web rendering control referred to herein as a Web Conduit (described further below). The Dot framework supports any Active-X based control which may be positioned and initialized in a Dot (e.g., an on-line stock trading company may implement a custom stock chart-rendering control and define a Dot to permit a user to interface with this control).

A Dot may be defined to include a static image over which dynamic data may be displayed, such as the example of FIG. 3 in which a static image of a cloud has rendered thereover dynamic (changing) data relating to likelihood of rain. Alternatively, the Web Conduit may render in control space 126 purely static data obtained from the Dot Definition, a URL, or the client device, as well as dynamic data resulting from client-run processes, pushed or pulled Internet content, etc.

The Web Conduit control is just one of many controls that may be included and positioned in a Dot's control space 126. For example, Active-X based control can also be referenced and inserted. This capability allows a Dot developer to implement a custom control. For example, a stock ticker display may be implemented as a custom secure chart control that renders stock tracking charts with small streams of secure xml data. Such a custom control can be laid out with a Web Conduit control next to it if the Dot developer chooses to do so. Also, just like a browser, a Dot developer may embed an active-x control in an HTML page rendered in the Web Conduit control as is the practice for use with full screen browsers.

Web Conduit Control

The Web Conduit (mentioned above) control can render Internet content in a fashion similar to Microsoft's Internet Explorer™ (IE). This control functionality may be provided, for example, by utilizing Microsoft's Internet Explorer's (IE4+) WebBrowser object. Note that the IE4+ object does not constitute a browser. The Web Conduit merely uses rendering tools of the object—it does not invoke or require the Internet Explorer application or any other web browser application. Rather, functionality is provided to support rendering of Internet content so as to integrate this control with the Dot framework and to receive and transmit messages in and out of the HTML rendered in the control.

Dot Identification

A Dot can be identified (in the Dot Definition 104) by three ID strings: GlobalID, Domain, and Kind reference. These are defined as follows:

GlobalID—A Dot's GlobalID is used when a Dot Definition is within a Share (described further below); this ID is unique with respect to other Dot tags in the Share.

Domain—A Dot's Domain is a unique label for the owning company Dot developer of the Dot.

Kind—A Dot's Kind (specified by the Dot developer) is a helpful identifier for finding the Dot; A Dot's Kind does not have to be unique.

Categories

In an embodiment of the present invention, categories are used as an organizational tool. A Dot Definition 104 (FIG. 3) may be provided with an element 150 defining the category (ies) with which that Dot is associated. A mechanism is provided to allow identification of categories of Dots, useful for selecting, sorting, organizing, etc. The categories that a Dot belongs may be edited by editing the string elements in the Categories element 150 of the Dot Definition 104. (See the specifications for the <ALL-CONFIG> and <DOT>DTDs in Appendix B.)

Events

A Dot Definition may also include an Events element 152 in which actions can be assigned to certain Dot Events such as the Dot's ONCLOSE event. DotEvents can be assigned a specific and targeted action much like a menu control 136 item; currently this action is implemented as a DotMessage sent to a specified recipient (see DMA messages, below). When the specified DotEvent occurs, for example ONCLOSE when the Dot closes, the specified message is sent to the specified recipient.

Hosting and Serving Dots

Referring again to FIG. 1, web server 50 may serve the Dot Definitions 104 as an XML file to client computer 20. The Dot Definition 104 may be served elsewhere such as a third party or partner server (not shown) along with the Dot content that fills in the Dot. In one embodiment, this XML specification may be kept proprietary and Dot developers define and package Dots indirectly without having to author XML Dot Definitions. In another embodiment, the xml specification is open, and content providers (and others) have complete control of the authoring of Dots.

Dot Definitions 104 are indexed and stored in server 50 in database 74, and are accessible to Dot-rendering and Dot-management applications (the Application Media Viewer) via "DotLinks". These DotLinks, based on standard Internet links, point to particular Dot Definitions and enable the Application Media Viewer (using standard HTTP/HTTPS requests) to quickly access the frame and initialization pointers or URLs in the Dot Definition to instantiate the Dot and render it, filling with DotContent (Internet content served by a partner Dot Developer servers 82).

Dot developers (e.g., content and/or service providers) serve the Dot content obtained from source or reference 108 (the standard internet content that fills in the Dot). According to one embodiment, Dots may be served my numerous different non-proprietary servers 50. Content may also be provided by a non-proprietary server, as specified by the Dot developer. Of course, it is possible that in other embodiments specific Dots may only be obtained from certain sources.

Because the Dot Definition 104 contains enough information to instantiate the Dot as well as the reference 108 that address the location at which the Dot content is located, a Dot is easily and quickly distributed, as well as collected and shared by users. (This is discussed further herein with regard to Viral Distribution Architecture.) It is therefore easier and faster to get information delivered in a Dot than in a web page.

This Dot-based architecture is very different than the current model of Internet content. Today, users visit web sites, following a destination-based model of content access. The process of accessing media therefore is sequential or linear, resulting in user viewing of one full-screen web page at a time. Furthermore, there is no simple to use or inherent mechanism in place today to share sites short of sending URL's.

Enhanced Dot Content

The Dot Definition 104 code is accessible, flexible and dynamic, enabling it to be modified at any time, even after it is rendered. For example, Internet content 101 (HTML) can access and modify its associated Dot Definition 104 by sending messages to other portions of the definition, such as the definitions of appearance 106 or control 107. Other application system-level functionality is also available by sending messages to the Application Media Viewer 199, discussed further below.

By using an architecture, referred to as Dot Messaging Architecture, for communication between Dots, and between a Dot and the Home Dot, standard Internet content can access and enable Dots to exhibit application behavior. That is, content can provide functionality typically associated with applications, such as dynamic refresh, contextual presentation, interactive response between user actions and changes in the graphical user interface or frame, etc. (See "Dot Messaging Architecture" below.)

EXAMPLES

The following examples are used to demonstrate key features of the present invention. Some of these features include: a new way to view standard internet content, a fully branded experience for the user, and a web experience that delivers true application behavior. Sample companies are used in these examples to demonstrate branding together with the use of internet content to produce a novel user experience that transcends the web page. Trademarks are those of the respective companies.

E*Trade

E*Trade's primary business is to enable users to execute securities trading online. Therefore stock information and notification are essential elements to their business, as are the transactions themselves. Persistent display is an important aspect of Dots as is the ability to provide ongoing data updates. Below is a list of aspects that illustrate novel advantages that Dots provide for a possible E*Trade Dots system.

E*Trade can leverage their existing content through Dots (Dots are built on top of standard HTML]

E*Trade can break their content into smaller pieces and package them into Dots.

E*Trade can give their Dots application behavior. Instead of being trapped inside a viewer window, content providers have access to the entire frame, which enables them to brand the Dot, access to application and system features. Content providers can also enable users to resize the Dot click, to open E*Trade Dot, ability to execute operations in the Dot such as trading stocks as opposed to only monitoring stock prices.

Because Dots can be left on or actively running and displayed on a client computer, they can notify users of coming/pending/immediate content events. A Dot can notify a user in many ways, including: popping up a message box or another Dot. A Dot can resize itself and show new content and/or bring itself into focus, as a window application may also do.

Merriam-Webster

In this example, Miriam-Webster has word definition content that is useful for users to access. Users may be better served by the Dot format of presenting as opposed to traditional web pages. Below is a list of features that illustrate this point.

Miriam-Webster can leverage their existing content to provide a dictionary "application" in a Dot; the content is HTML delivered from their servers. In a Dot, Miriam-Webster can provide direct access to just the information users are interested in viewing without requiring them to disengage in other operations such as word processing work in order to actively seek information from Miriam-Webster's servers. Additionally, content providers can add new functionality to their Dot applications just by changing the HTML files on their servers that are delivered to Dots or as Dot Definitions 104. They do not need to revise and redistribute custom client software.

eBay

A single company such as eBay can use multiple Dots to engage users from many points at the same time to facilitate a more complex process, such as online auctions or shopping. Many companies have an enormous amount of assets (content, services, and applications) that can only be exposed to users one page at a time. Featuring and exposing new or important functionality is often difficult to do if they are buried several pages deep.

Dots enable content providers to feature and expose functionality and services in a new form, leveraging and featuring all of a company's assets in a consistent way. eBay, for example, might provide a "MyBids" Dot that allows users to more closely follow those items they have bid on (the current asking price and when the auction will expire).

eBay can also provide a Gallery Dot. Instead of wading through thousands of thumbnails in the gallery section to find what their looking for, users can identify categories they are interested in and window shop these items, click on a particular item to add new item to MyBids Dot. When a user finds something that interests him, it's added to the MyBids Dot with a single click.

There is a messaging architecture (DMA) that may be enabled by the Dots architecture disclosed herein which enables Dots to communicate with each other, thus facilitating operations between Dots without user intervention. For example, a user finds an item of interest in a "Gallery" Dot. He clicks on that item and it is added to the "MyBids" Dot with a single click. Additionally, a "BidDot" may be caused to pop up for that single item, allowing a user to directly bid and monitor the auction process. He clicks on a second item in the "MyBids" Dot and another "BidDot" pops up.

MP3 Dot

By using an embedded MP3 playing control, an MP3 playing Dot can access, play, and manipulate MP3 files and playlists from a local hard drive or the web, just like a custom MP3 client application. The significant difference is that the GUI & controls (the Dot Definition 104) are entirely Internet content (HTML, javascript, etc.) and can change simply by modifying HTML files online.

Mobile/Other Platforms

Dots can be viewed as a smaller-format package for internet application media. This package is more portable than executable applications as well as full screen formatted media for browsers. Portability across platforms requires consideration of diverse screen sizes and resolutions as well as operating systems and user interface controls. This diversity requires companies or users who require cross platform media distribution to scale down their existing content for portability to mobile devices. No such scaling down is required when deploying Dots and the Dot architecture.

Application Media Viewer (Home Dot)

As previously mentioned with regard to FIG. 1, a client computer 20 will ideally have stored thereon a software component referred to as an Application Media Viewer (or Home Dot) 119. As Application Media Viewer 119 performs a number of functions in the process of acquiring, instantiating, modifying, etc. Dots, in addition to simply viewing Dot content, we also refer to an Application Media Viewer as Home Dot herein. The Home Dot 119 is effectively a client application that contains the procedures or calls to procedures for rendering and managing Dots on the client computer. It therefore has attributes of an application. The Home Dot is designed to operate in conjunction with a Dot Definition, and vice versa.

Data contained within an Application Media Package (Dot) is parsed by the Home Dot. Control calls contained within the Dot are also parsed and executed. The Home Dot may then instantiate a Dot without relying on functionality provided by a browser. In fact, in a preferred embodiment, a browser is not employed to instantiate or operate an Application Media Package.

The Home Dot is a compiled application, and can be programmed using, for example, MFC (Microsoft Foundation Class) or the like. The Home Dot need only be downloaded to the client computer one time and may be used to instantiate any number of Dots. The Home Dot is capable of executing and displaying multiple Dots simultaneously.

The Home Dot may be provided with the ability to automatically or manually check for updated versions of itself on a server. If a newer version is detected, the user may be provided with the opportunity to download and install the updated version of the Home Dot.

The Home Dot supports a number of functionalities, including support for standard internet protocols (http, https, etc.) Additionally, the Home Dot supports collecting and organizing Dots, user login to a Dot server, user activity statistics collecting and reporting, and messaging between Dots, as discussed further below.

Network Distribution of Dot and Home Dot

Figure 6:
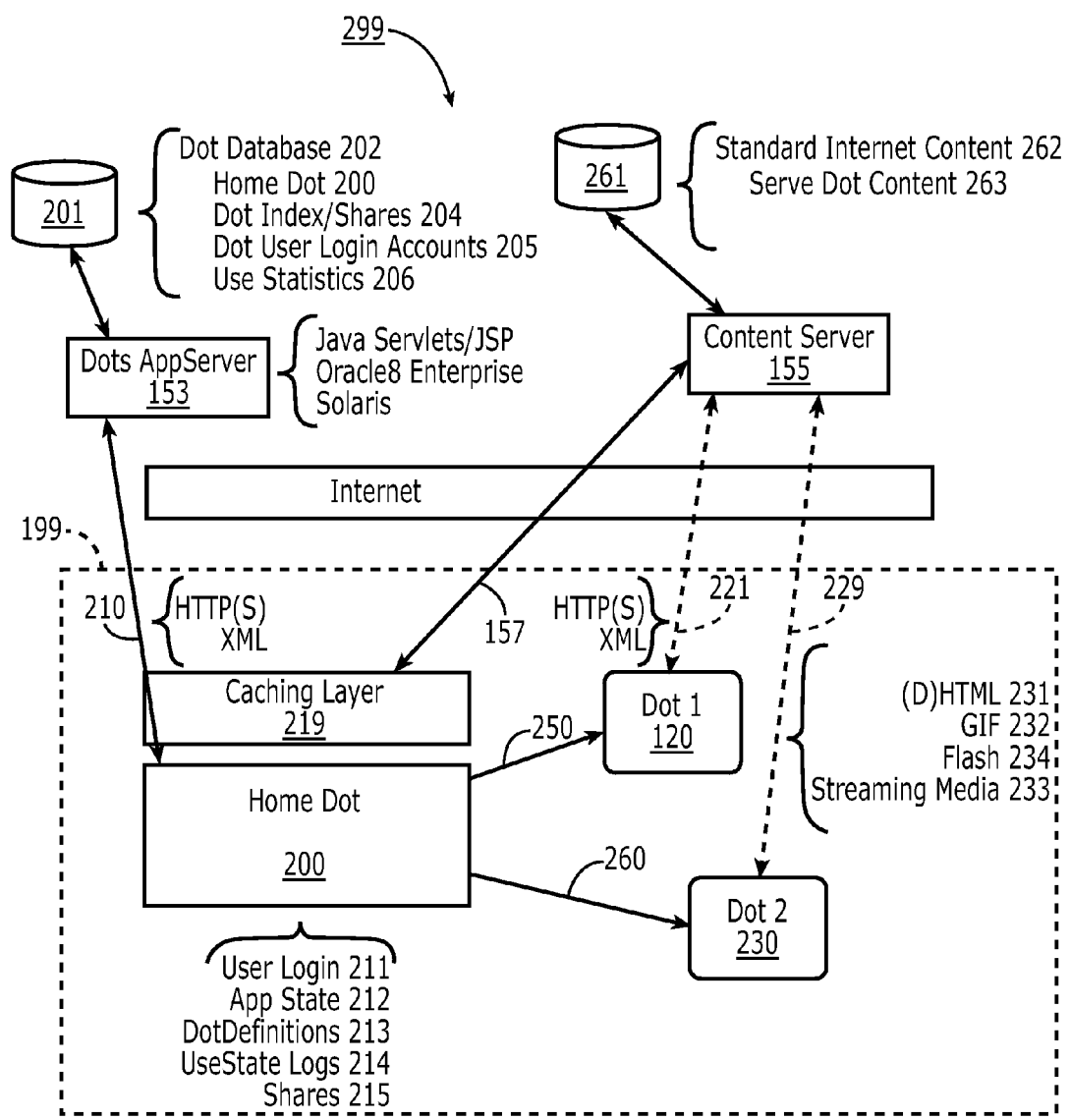
FIG. 6 is an illustration of the communication flow associated with the acquisition and instantiation of an Application Media Package (Dot) according to one embodiment of the present invention.

Referring now to FIG. 6, a communication flow diagram 299 is shown for an exemplary system enabling the distribution and use of Dots between a client computer 199, a server (Dot server) 153 making available one or more Dots including a Home Dot, and content server 155, each with a network address or IP address. It will be assumed for this particular example that a Home Dot 200 has previously been downloaded and installed on client computer 199. It will also be assumed for this example that Dots 120 and 230 have been previously requested (the mechanism for this request is described further below).

Accordingly, Home Dot client application 200 utilizes Dot Definitions to instantiate Dots 120, 230. There may be ongoing communication 250, 260 between Home Dot 200 and Dots 120, 230, respectively. This communication may include data for the presentation of Internet content, messages, and/or state information. Furthermore, the Home Dot client application 200 executing on a client computer 199 communicates with Dot server 153 through a channel 210 (such as a broadband Internet connection) as well as Content server 155 through channel 157. Internet content is received by Home Dot 200 and rendered into the instantiated Dots 120, 230, as appropriate. The Internet content may be one or more of many formats, such as XML, HTML, GIF, Streaming Media, Flash, HTTP, HHTP(S), etc.

The Dot server 153 is communicatively connected to a physical memory device 201 which holds a database 202 containing software objects for downloading to or access by a client device such as client computer 199. This physical memory device 201 may be a RAID hard drive system, a standard hard drive, removable media, or any other type of volatile or non-volatile memory known in the art. Database 202 may contain one or more Dot Definitions 104, the Home Dot client application 200, available for download to the client device, as well as user account data 205, state data including use statistics 206 and Dot index/shares 204 (each described in further detail herein).

The content server 155 is communicatively connected to a physical memory device 261 which holds the Internet content 262 as well as other forms of data 263. Content/data 262, 263 is communicated to the instantiated Dots 120, 230 where it is rendered on the client computer 199. In general, content passes first through the Home Dot application 200 or a similar client computer 199 program that is capable of receiving and parsing Internet content. Therefore, the connections between content server 155 and Dots 120, 230 are shown as dashed lines, indicating that for this figure the connection is indirect.

Unlike a downloadable custom client application, the Dot Definition 104 is comprised entirely of Internet content in a web browser readable language. To instantiate a Dot on a client device or computer, only its definition is required (assuming that the computer is Dot-enabled, i.e., that the Home Dot client application 119 has been installed). The Dot Definition 104 contains just enough information to define, layout, and initialize a Dot's components (frame, controls, etc.); this information configures the graphical user interface which may then present Internet content therein. Consequently, a Dot Definition typically has a small file size (~2 KB), and is therefore a quickly accessible and loaded XML file.

Figure 7:
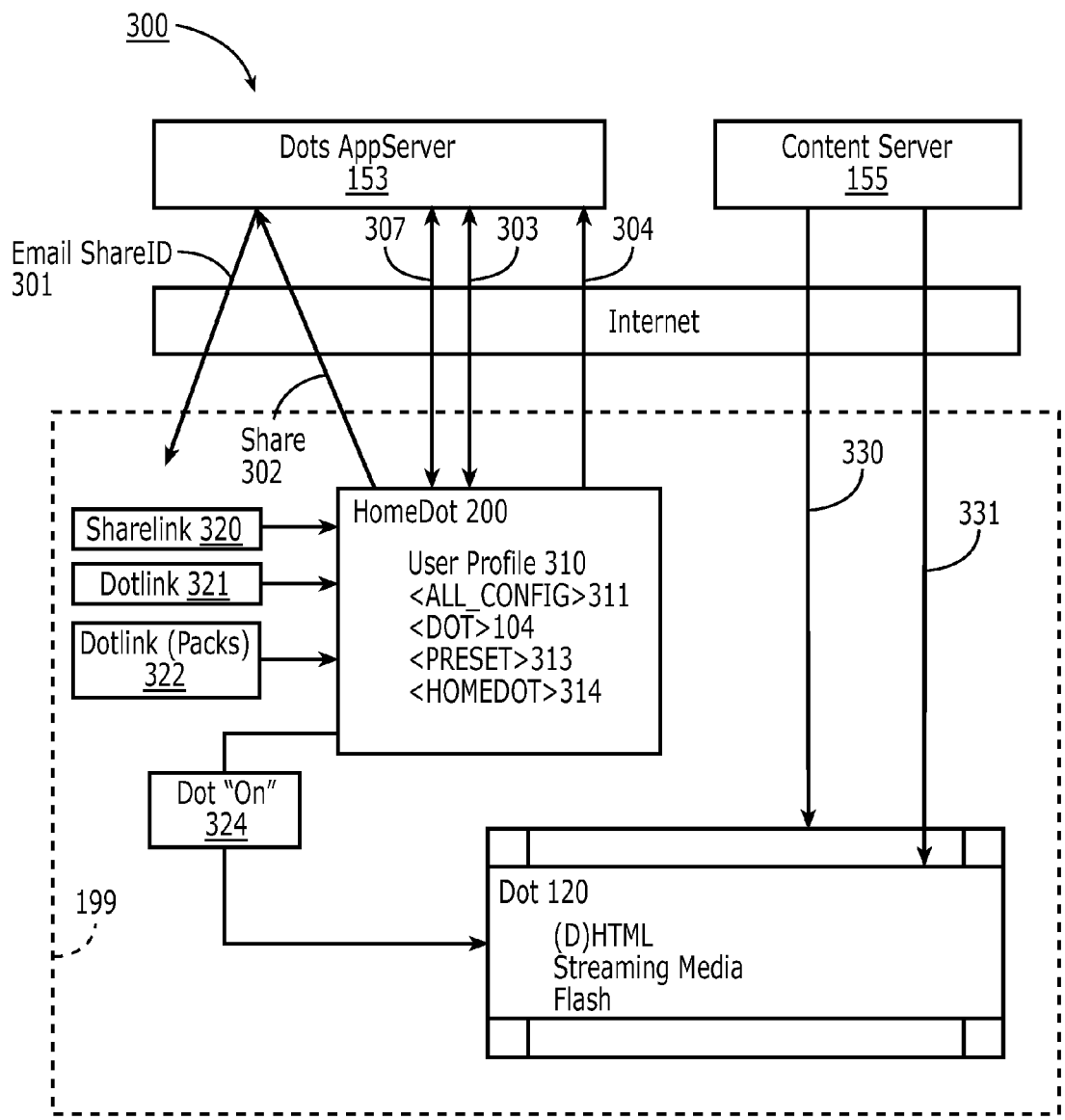
FIG. 7 is all illustration of the communication pathways associated with the building of a user profile, and the acquisition of Dots through links, packs, and sharelinks according to one embodiment of the present invention.

One aspect of software distribution according to the present invention may proceed as illustrated in FIG. 7. A user first requests a Dot, or more specifically its Dot Definition 104, by clicking on a Dot link 321 which may be a hyperlink on the web page of a Dot server 153, a web page of a partner or content server 155, or selectable menu item on the client computer 199. A Dot link 321 is an Internet link to a Dot Definition 104. A Dot link operates in a manner similar to an HTML link. One added feature associated with a Dot link is that the server that serves the Dot Definition 104 typically has a sensing mechanism that can determine whether or not a user has the Home Dot application 200 installed on his computer or device 199.

If the user does not have the Home Dot application 200, then it is downloaded and installed with a first set of Dots (e.g., 120, 230) that may be user-selected or part of an initialization set. This download process is discussed in further detail below. From that point forward, the client computer 199 is Dot-enabled and does not require a subsequent download and install of the Home Dot. In short, only a single application-like software product need be downloaded and installed on a client device to enable a variety of different Dots, as opposed to requiring a user to download a different custom client application for different types of Internet content.

Once a client machine 199 is Dot enabled, (Home Dot application 200 installed), Dot 120 may be rendered by simply clicking on Dot link 321. This rendering is typically faster than it takes to load and render a small web page. Furthermore, once the Home Dot application is installed on the client no additional executable software need be downloaded or install to view and interact with a Dot. The Home Dot application 200 accomplishes this by retrieving the Dot Definition 104 specified by the Dot Link 321, instantiating the Dot 120, obtaining the Internet content specified by the Dot Definition 104, and presenting the Internet content (standard Internet content from DoDots' partner servers 155) within the Dot.

Once a user has received a Dot Definition 104, the Home Dot application 200 remembers the Dot's Dot Definition 104 as part of a user-profile 310 so that it can instantiate the Dot and begin filling it with Internet content immediately. Because a Dot Definition 104 becomes part of a user-profile 310, it can be modified by use (e.g., the image of its default title bar 125 may be changed, its Web conduit control may be navigated to a different URL using DMA messages, etc.) and the Dot will initialize from its last state stored in user profile 310 the next time the Dot is to be instantiated (or "turned on") at 324.

A Dot Link 321 represents a Dot. Therefore, this Dot Link 321 (and hence the Dot 120) can be easily and instantly distributed; the Dot Link 321 can be posted on web sites to promote the Dot, or shared with friends via email. This is viral distribution of a Dot, via distribution of the Dot Link 321—the Dot server hosts and serves the Dot Definitions 104 to which the Dot Links 321 point. Dots may also be aggregated into packs by content providers, or other aggregator, grouped for example by like subject or perceived common user interest, and the packs of links acquired by a user at 322 as if they were single Dots. A user may also provide others with access to Dots when the actual Dot Definition is located on a remote third party Dot server. This may be accomplished by way of a Sharelink, which may be provided by a user at 302. Others may then access the Dot, including setting changes that may have been made by the user, by accessing the Sharelink provided at 320.

Figure 8:
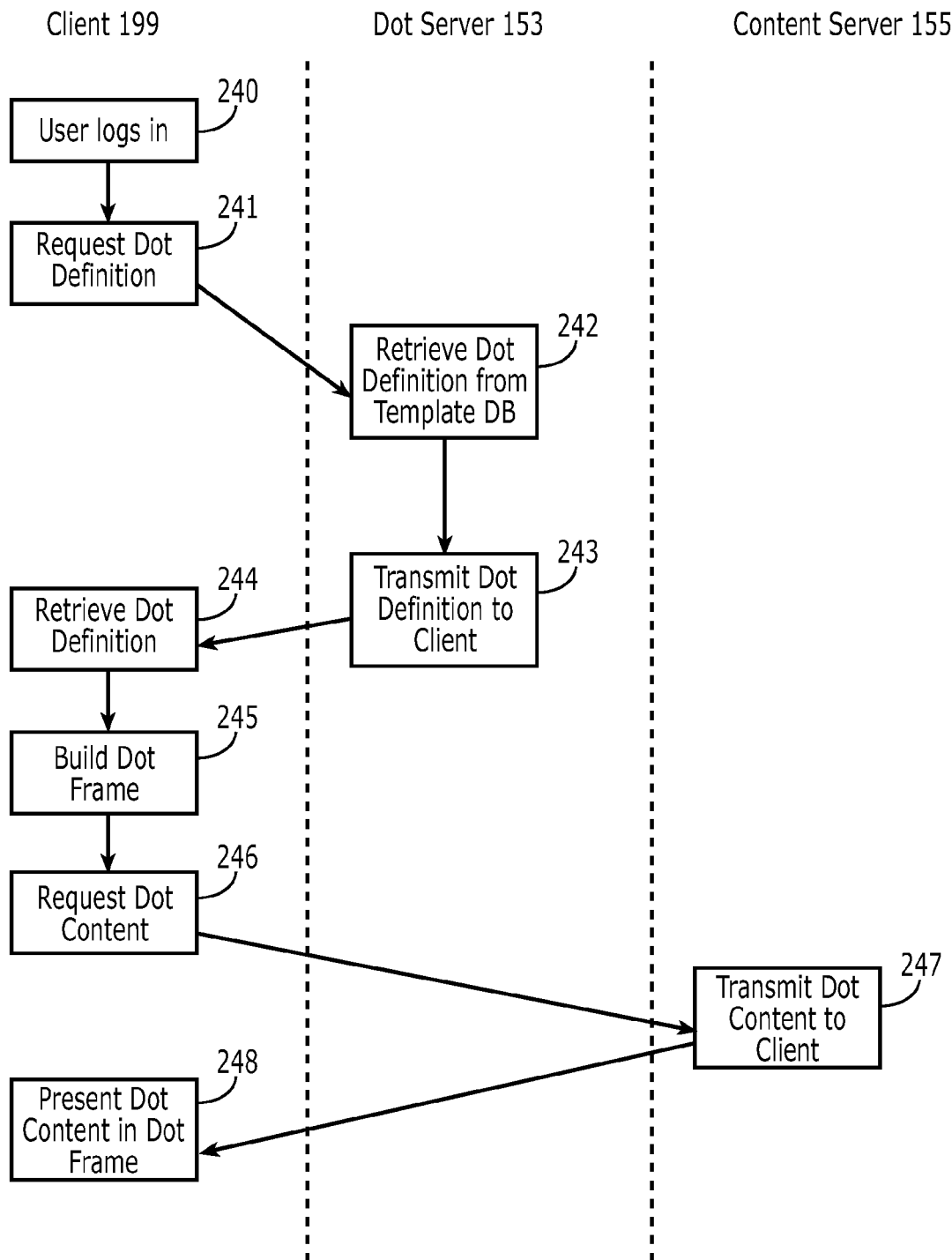
FIG. 8 is an illustration of the communication pathways associated with the acquisition and instantiation of an Application Media Package (Dot) according to one embodiment of the present invention.

From the client perspective, one example of a process of acquiring and instantiating a Dot is illustrated in FIG. 8. According to this process, a Home Dot is employed to acquire a new Dot, however it is within the scope of the present invention to acquire new Dots through other mechanisms, such as through a web browser application (with utilization of the Home Dot ultimately required in order to instantiate and populate the Dot). After logging in at step 240 the user clicks on the Dot Link signaling a request to acquire the Dot. The Home Dot application then sends a request to download the Dot to the Dot server 153 at step 241. Alternatively, the user may click on a Dot link before logging in, for example if the link has been e-mailed to the user, and then, after clicking on the link, log in. In another aspect, the user could view, but not collect, a transient Dot without ever logging in.

After the user is logged in and has clicked on the Dot, the Dot server 153 retrieves the Dot template from its Dot database, and provides it to the client in step 243. The client receives the Dot template from the Dot server 153 in step 244.

For display of the new Dot, the Home Dot creates a frame in the display of the user interface (42, FIG. 1) in step 245. In step 246, the client 199 requests the necessary Internet content stored at the URL(s) identified in the Dot Definition from the corresponding content server 155. The content server 155 transmits the content in step 247, and in step 248 the Home Dot presents the content in the viewer. As the type of content may vary greatly, the content may appear within the frame (such as text or images) or may be independent of the frame (such as audio) but the frame including controls for controlling aspects of the presentation of the content. In one embodiment, Internet content is presented such that it is enclosed by the frame, allowing the user to preview the Dot. Alternatively, the Home Dot may simply collect the Dot, adding it to the user's processed user profile 310.

The user may then view the Dot on the user interface display 42, and may interact with the Dot much in the same way as a user may interact with typical Internet content or web applications. This may change the Dot from its present, "raw" state to a used state reflecting alteration or use of the Dot by the user. Thus, the user has stored on client 199 a Dot Definition rather than a Dot template. For example, the user may direct the Dot to display different content within the Dot if the Dot content enables the user to do so. Or, the user may provide information to the content server 155 which allows the Dot to be personalized. The user may additionally be given the option of changing the size or location of the frame, etc.

If the user collects the Dot, the Dot will be added to a user's list of collected Dots. For example, the Home Dot may add the Dot's definition to a processed user profile (discussed further below). Thus, the Dot's "state" will be preserved. Alternatively, the Home Dot may collect the Dot automatically, without waiting for a user command, by adding the Dot Definition directly to the processed user profile.

If the Dot's state has been altered by the user or by the content—if, for example, the user has directed the Dot to Internet content other than the initially-displayed content, provided personalizing information, or changed the properties of the frame, or if the content itself has caused an alteration in the Dot—this alteration will be reflected in the Dot Definition stored in the user profile. Information which personalizes the resulting content, instead of being stored in a "cookie" on the client device, can be stored as part of the Dot Definition. This advantageously permits personalization of content, such as Internet content that is associated with the Dot content and the user, without storing a cookie on the client 199. One advantage this provides is that the state of a Dot can be returned for a user no matter which computer the user accesses the dot from.

Figure 9:
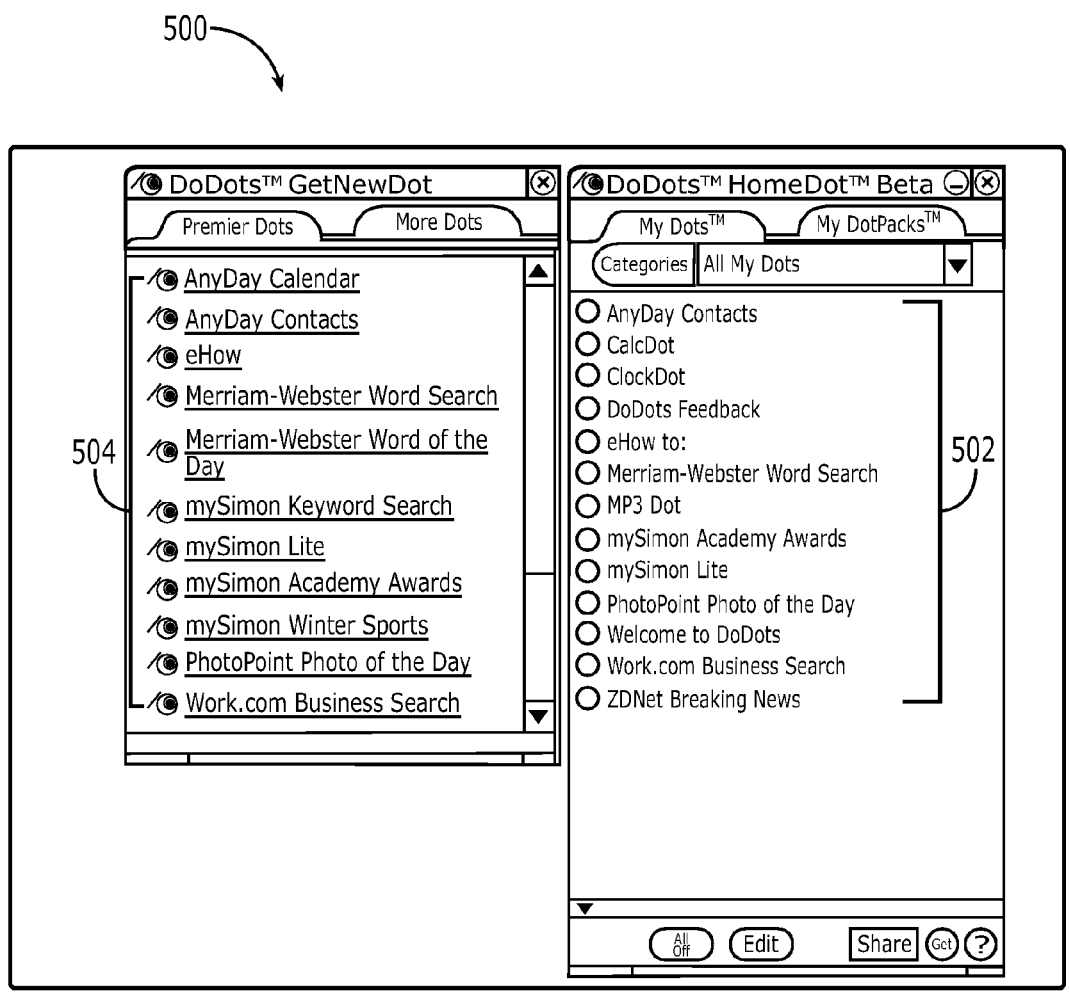
FIG. 9 is an example of a display showing Application Media Packages (Dot) available for downloading as well as Application Media Packages (Dots) already downloaded according to one embodiment of the present invention.

A user may also access a Dot which has been previously collected, and possibly altered by use as explained above. As previously described, the user profile includes Dot Definitions for Dots which have been viewed and collected by the user. A screen shot showing Dots 502, which have been previously collected by a user is shown in FIG. 9. Also shown are Dot Links 504 available from a Dot server for download to the client.

Figure 10:
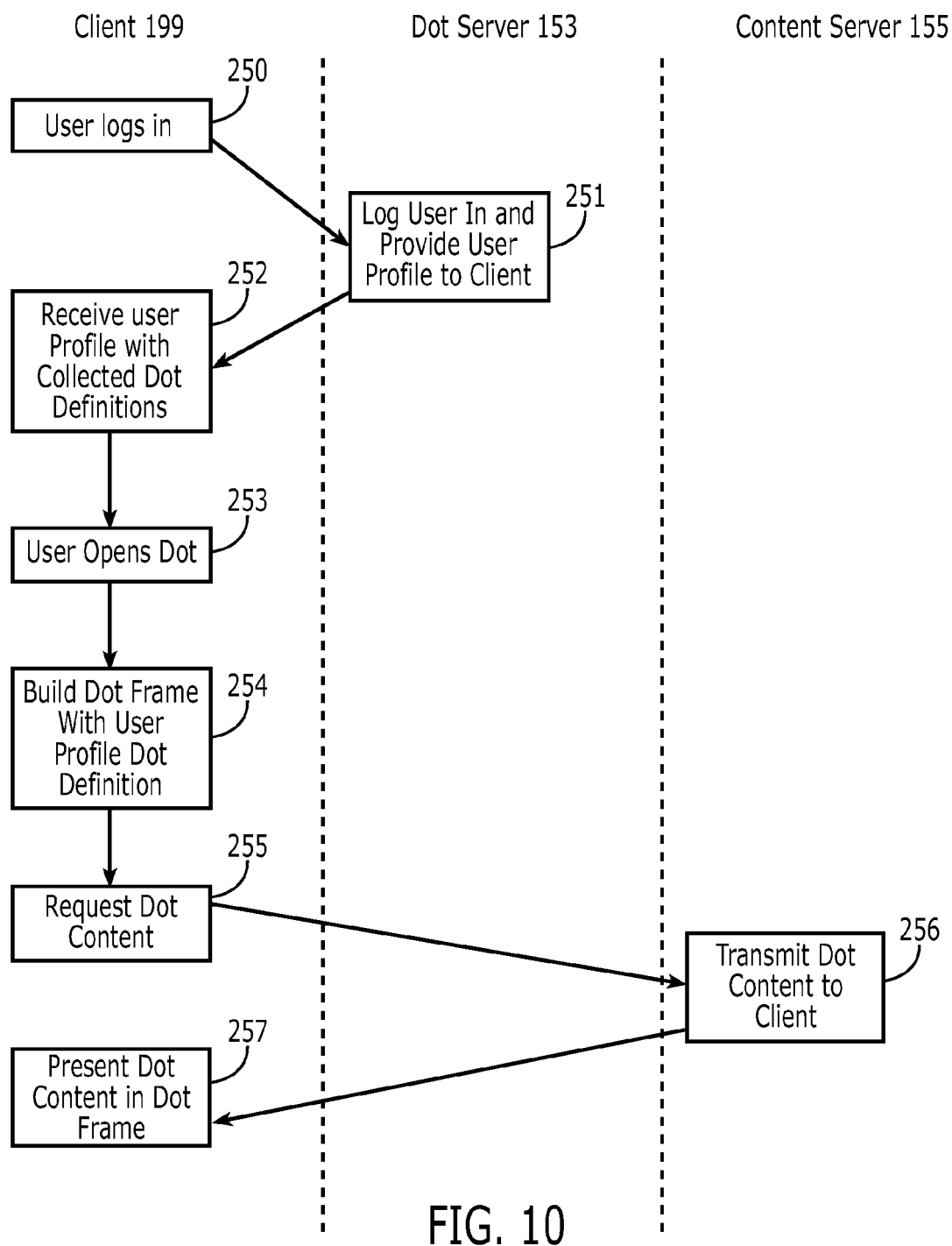
FIG. 10 is an illustration of the communication pathways associated with the instantiation of an already-acquired Application Media Package (Dot) according to one embodiment of the present invention.

One embodiment of the steps taken to provide the user with Dots which have been previously collected are shown in FIG. 10. According to this process, acquired Dot Definitions are maintained on a central server, and a user profile identifies which Dot Definitions are associated with particular users. This is useful when a user may be using more than one computer and wishes to have access to her collection of Dots on any machine she is using. However, it is equally within the scope of the present invention that Dot Definitions may remain resident on a user's computer and not be stored for that user on a central server or the like.

As discussed above, on login at step 250 the user's profile is retrieved by the Home Dot stored on the client (step 251 and 252). The user's profile, stored in the user profile database, includes the Dot Definition for each of the Dots previously collected, and possibly altered, by each user. The Dot Definition, as discussed above, includes the Dot frame definition and the definition of the controls for filling the viewer within the frame with content. After log in, a local copy of the processed user profile is stored on the client 199, and this copy is further processed as the user collects new Dots, or uses new or collected Dots such that the Dots are altered.

When the user clicks on the name or icon of a collected Dot at step 253, the Home Dot creates a frame in the display of the user interface (40, FIG. 1) in step 254. At step 255, the Home Dot causes the client 199 to request the Internet content from the URL identified in the Dot Definition from the corresponding content server 155. This content is provided in step 256. It will be appreciated that the URL need not be the same as the initialization URL in the Dot template stored in the Dot template database 202 on Dot server 153, and in fact the content server need not be the same content server corresponding to the initialization URL. In step 257, the Home Dot places the content in the Dot frame, and the Dot is then fully instantiated with content.

Hosting Dot Definitions

Dot web servers 153 host and serve the XML Dot Definitions 104 and provide the Dot Links 321, Dot Packs 322, and sharelinks 320 that point to the Dots so that a user can easily and instantly add the Dot 104 to their Home Dot application 200 (adds Dot 104 to their user-profile 310) simply by clicking on the Dot Link 321, pack link 322, or sharelink 320. The Home Dot application 200 registers with the local browser/computer so that Dot Links 321 are handled by the Home Dot application 200 (and not by the browser).

Dot Templates and the Dot Index

New Dot Definitions 104 get published to a Dot index 204. A Dot Definition can be modified by a user once downloaded. Since these new Dot Definitions are resident on the server for downloading, they are also referred to herein as Dot templates. The Dot index stores Dots definitions or templates 104 in database 202 on Dot server 153 by category (such as sports, finance, games, etc.) with descriptions and images for each Dot. In the preferred embodiment, Dot Definitions 104 are published to categories specified by the Dot developer. Categories can also be automatically created to support indexing Dots that are most popular (most commonly accessed, most commonly shared, or other sorting criteria).

Dots as well as their index are formatted as Internet content. Therefore, users can browse or search the Dot index for new Dots using either a browser or using their Home Dot application 200 application (via an AddNewDot Dot or like functionality).

Each of these Dot templates (Dots definitions 104) are pointed to by a Dot link 321; the Dot link 321 for each Dot is generated automatically by the server 153 (when the Dot is published or previewed) to reference that Dot. Clicking this Dot link 321 adds the Dots definition 104 to the user's Home Dot application 200 (via the user profile 310) and turns the Dot on (instantiates it and fills it in with internet Dot content).

Once a user receives a new Dot (Dots definition 104) by clicking on a Dot link 321, the Dot template is downloaded and becomes a Dot Definition 104 forming part of their user profile 310 (the XML data that defines which Dots the user has, which Dots they left open, what the state of the Home Dot application 200 last was, etc.).

The Dot server 153 may optionally host Dot Definitions 104 as part of user profiles 310. Every Home Dot application 200 user has a user profile (expressed in XML) that stores the Dot Definitions 104 that the user has collected as well as the last state of the Home Dot application 200. (See also the specification of the <ALL-CONFIG> DTD in Appendix B.)

In an additional optional embodiment, when a user successfully logs into the Home Dot application 200, state restoration may be provided by Dot server 153. In this embodiment, authentication may be handled by the Dot application server 153 (as opposed to the user device and Home Dot). The Home Dot application 200 requests the user profile's <ALL-CONFIG> file 311 by communicating with Dot server 153 at 303. The Home Dot application 200 then receives the <ALL-CONFIG> file 311 from Dot server 153 at 303, and restores its state (from the <ALL-CONFIG> 311) presenting last user state, i.e., which Dots were ON, where the Home Dot application 200 was positioned on the screen, etc.)

The Home Dot application user interface (UI) enables a user to turn a Dot ON 324; in this case the Home Dot application 200 has the Dot Definition 104 (part of the user profile 310 that was retrieved on login) that contains enough initialization data to instantiate the Dot and fill it with content just as the user left it.

As previously mentioned, Dot Definitions 104 that are part of a user's profile 310 may differ with use. In other words, the Dot Template from which they were originally created may have a different state than a Dot Definition 104 that has been modified through use. The user profile could also be implemented to point to Dot Definitions 104 that are always hosted remotely (and/or not entirely part of the user profile).

Centralization of Dots within the Home Dot 200 enables users to collect Dots. This feature is significantly different than today's model of the Internet in which users visit a page one at a time, and then leave. Users collect Dots, keep them running, and share them with others. By packaging Internet content as a Dot and referencing it by a Dot link 321, Internet content is given viral characteristics (i.e., Dots can be instantly distributed). (See also the Session_Config Example found in Appendix B.)

Shares

Dot servers 153 also host Dot Definitions 104 as part of Shares. Because a Dot link 321 represents a Dot, this Dot link 321 (and hence the Dot) can be easily shared (distributed via email) from one user to other users.

If a user receives a Home Dot application share and has the Home Dot application 200 installed (their machine is Dot enabled) then clicking on the Share Link Dot link 320 in the share will add the Dot(s) in the share to the user's Home Dot application 200. If a recipient of a Share Link doesn't have the Home Dot application 200 installed, then the Home Dot application 200 is downloaded and installed (with the user's cooperation) with the first Dot(s).

When a user shares Dots, their Home Dot application 200 generates a share file (XML file) that contains the Dot Definitions 104 of the Dot(s) included in that share. The Share XML is then sent to Dot server 153; the Dot server 153 automatically generates the Share Link 320 that references the Share XML. This Share Link 320 rather than the Share XML is sent or distributed (via email or posted on a web site) to other users. (See also the specification of the <SHARE> DTD found in Appendix B.)

Software Product Download Process to Client

Figure 11:
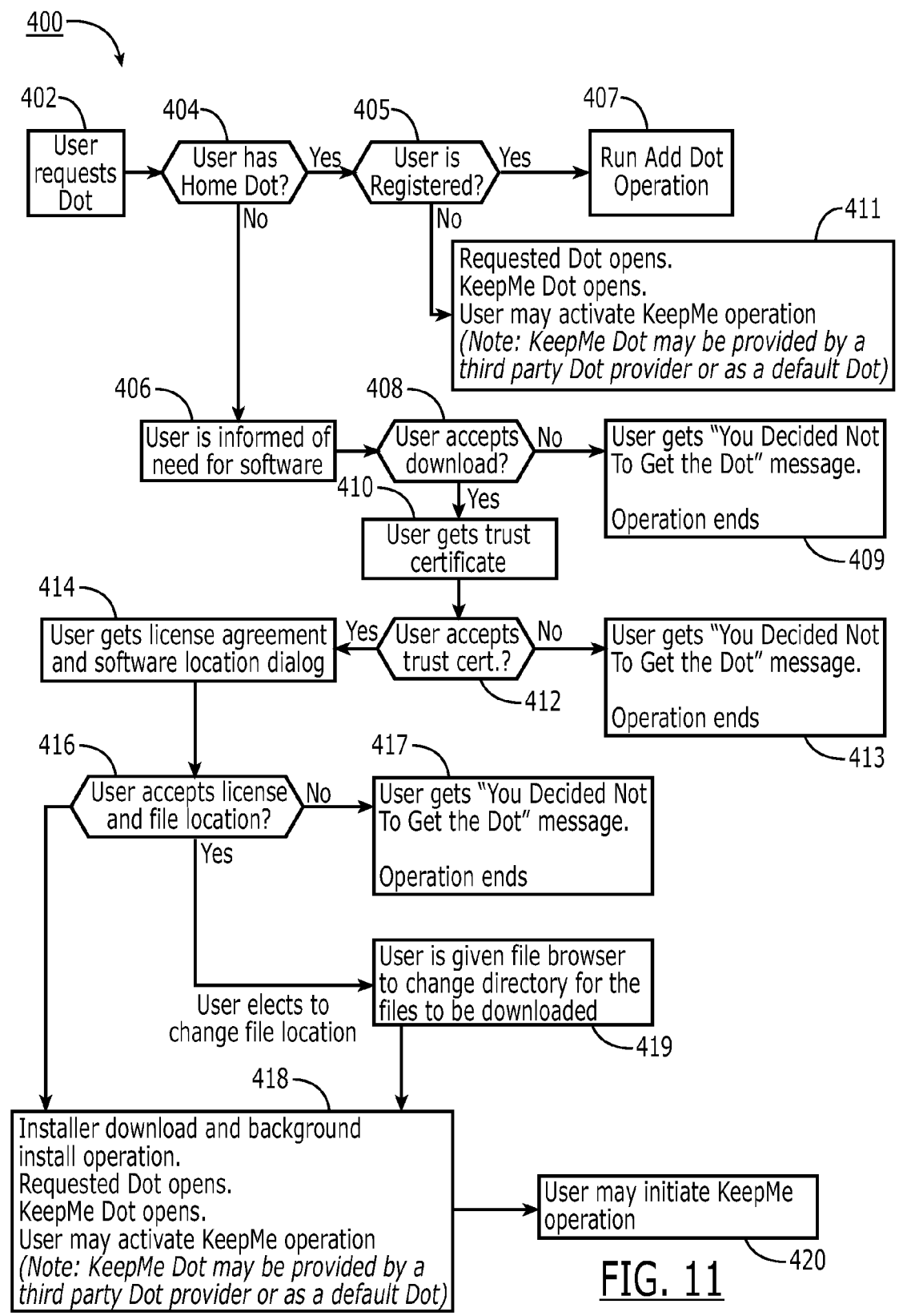
FIG. 11 is a flow chart illustrating the download process of an Application Media Package (Dot) and Application Media Viewer (Home Dot) according to an embodiment of the present invention.

Reference is now made to FIG. 11, which is a flow chart 400 illustrating the software product client download process. According to one embodiment, to begin, a user makes a request for a Dot at step 402. At step 402 it is determined that the user does not have the Home Dot application 200 installed. Step 406 comprises of the following:

User is informed of need to download software to view Dot. The message could be from the site owner (content provider) or from a Dot server.

"Do you trust [provider/Dot server host]?" dialog is presented to user at 405. A dialog then tells the user the size of download and approximate time for download.

In step 408, the user clicks the "Yes" button. (Alternatively, if the user clicks the "No" button, step 409 executes with an exit message such as "You decided not to get the Dot"). Proceeding now to step 410, the user gets a Trust Certificate (a security process well understood in the art). The user accepts the Trust Certificate in step 412. (Alternatively, if the user declines, step 413 executes with an exit message such as "You decided not to get the Dot"). In step 414, the user accepts and receives the license agreement and is presented with a dialog that asks the user to confirm the directory for download location. (Alternatively, if the user declines, step 417 executes with an exit message such as "You decided not to get the Dot"). In step 416, the user accepts the license and confirms the file location, and proceeds now to step 418. The download process begins, followed by the installer download and background install operation. The requested Dot opens, and the "KeepMe" Dot opens. Note that the "KeepMe" Dot may be provided by a third party such as a content provider. If no third party-provided "KeepMe" Dot exists, a default "KeepMe" will open.

In step 420, if the user decides to keep the Dot, the KeepMe (Dot) Operation initiates (see below). If the user decides to close the requested Dot before selecting "KeepMe" and then decides to select "KeepMe" the requested Dot will close, the Keep Dot operation will initiate and the requested Dot will be added to the Dot list. Alternatively, if the user closes the requested Dot and the "KeepMe" Dot without selecting "KeepMe" the Home Dot application 200 will remain installed but the Home Dot application 200 UI will not be available to the user. Lastly, if the user decides to close the "KeepMe" Dot before closing the requested Dot the user will not be able to initiate the Keep Dot operation.

The other branches of the flow chart 400 will now be described. Beginning once again with step 402, the user requests Dot. According to the alternate branch leaving step 404, the Home Dot application 200 is found on user's machine. In step 405, it is indicated that the user is not registered. (Alternatively, if the user is registered, the Add Dot operation is executed step 407 and the process terminates). Proceeding therefore to step 411, the requested Dot opens. The "KeepMe" Dot opens ("KeepMe" Dot may be a default Dot or a "KeepMe" Dot provided by the Dot/content provider). If the user decides to keep the Dot, the Keep Dot operation then initiates (see below). Alternatively, if the user decides to close the requested Dot before selecting "KeepMe" and then decides to select "KeepMe" the requested Dot will close, the Keep Dot operation will initiate and the requested Dot will be added to the Dot list. In another scenario, if the user closes the requested Dot and the "KeepMe" Dot without selecting "KeepMe" the Home Dot will remain installed but the Home Dot UI will not be available to the user. If the user decides to close the "KeepMe" Dot before closing the requested Dot the user will not be able to initiate the "KeepMe" operation.

The following is a summary of the "KeepMe" registration operation (assuming an unregistered user has a partner's Dot open):

User clicks "KeepMe" button of "KeepMe" Dot.
    User registration form launches.
    User form displays in "KeepMe" Dot.
    User form includes link to privacy statement.
    User completes user registration form and submits.
    Home Dot appears.
    Welcome Dot appears.

In one embodiment of the present invention, it is possible to track the referring partner, for example for awarding incentives for referring a user. The form of the incentive is a matter of business choice. However, in such an embodiment, the registration operation will comprise the additional step of:

Crediting the referring party (e.g., partner) with the referral and/or converting user.

For an alternative software download process, refer to U.S. Provisional

Patent Application Ser. No. 60/176,687, Appendix F—Do-Dots Feature Priority List PPA.

It will be appreciated that the present invention addresses scaling issues by breaking content up into smaller, more focused software components. These smaller software components (Dot Definitions 104) may thus be served to mobile devices to compensate for bandwidth and content feature support issues, to overcome a lack of browser functionality and processing overhead, etc. Furthermore, the architecture supporting Application Media Packages or Dots offer a consistent experience with application media or Dot content 104 across device types, e.g., similar experiences as between desktop, laptop, web-enabled phone, PDA, etc. As Dots are distributed as easily as web pages are viewed/visited, Dots can be instantly distributed and users can stay connected with content providers of their choice without having to download custom client software from each provider, and without regard to the device type being operated.

For further details on the structure of the XML structure used for Dots according to one embodiment of the present invention, see Appendix A hereof. For further details on the functions and design of Dot server 153, see Appendix B hereof.

Application Media Viewer—the Home Dot

One unique aspect of the present invention is the interaction between the application media package 104 and the application media viewer 119. This aspect is now discussed.

As mentioned, the application media viewer, or Home Dot, is a network enabled client application. With respect to the user experience, the Home Dot provides the parsing and rendering function of the application media packages or Dots. It also provides for the application behavior of Dots by executing calls or methods that are parsed from the Dot by the Dot Definition, user events, system events, or the like. That is, at a minimum, a Dot comprises a definition of a graphical user interface (frame) and content to be rendered within or associated with that frame. Thus, a critical function of the Home Dot is to parse the Dot definition, render the frame, obtain the content, and render the content in or associated with the frame.

As previously discussed, the Home Dot comprises Internet content. Thus, the Home Dot is in part a content parser, providing rendering of the graphical user interface (GUI) from Internet content.

Furthermore, Dots originate on remote network devices. Thus, another function of the Home Dot (client-side) is to obtain and organize Dots on the computer on which the Home Dot resides.

The Home Dot is a part of a client/server system. As a client installed in one of a multitude of client computers, all communicating with a Dot server, the Home Dot maintains communication with that server to perform system functions for the client. These system functions require a defined command set or functions calls between the client and server. Such functions may include user login, user account status, use statistics, Dot downloads, individual Dot configurations or user customizations, Dot organization, revision updates for both Dot and Home Dot installations.

Because the present invention enables versatility in the manner of packaging and operating with Internet media (forming application media packages), and because the breadth of internet media and the scope of available information is expansive, the present invention also provides for methods of Dot organization on a user's client computer. More specifically, the Home Dot provides for Dot management for a large number of Dots. Such methods of management include grouping Dots into an organized layout for persistent display, categorizing and grouping Dots into Dot Packs, opening and closing sets of Dots or Dot Packs according to a user's current information requirements, and configuring individual Dots either by user defined categorization or customization parameters that have been enabled by a Dot's developer.

The Home Dot according to the present invention provides for methods for grouping Dots, sharing information between Dots, and sharing these groupings with others. In other words, the present invention provides for methods by which a user or other third party or collectively, third parties, may build upon the utility of Dots as an atomic media element by adding their context through grouping and configuration. In doing so, the present invention enables the addition of third party knowledge that may or may not include the participation of the original Dot developers. Furthermore, the present invention provides for mechanisms by which this knowledge is shared. These mechanisms include saving the customization states of individual Dots, grouping of a plurality of Dots and saving them to a Dot server, and emailing links to other users or installing these links in a web page. Additionally, the present invention provides for third parties to share collaborative efforts by posting such groupings and customizations on a Dot server for general availability.

In addition to grouping and customization, sharing information and events between Dots is provided for by the present invention. The Home Dot routes messages between Dots and the system. Messaging enables Dots to act upon one another such that an action or event that affects one Dot may also be routed to another Dot, thus affecting a change to it or an action to be taken by it. The resulting actions or changes of the individual Dots may not be the same. To support messaging generally, levels of restrictions are also provided for. It is therefore possible to control the scope of messages received by a Dot from other Dots according to membership or domains. Likewise, it is possible to control transmission of messages to other Dots. Therefore, the present invention provides for cooperative messaging and information sharing between Dots as enabled by Dot developers.

In one embodiment, the server is a high availability system comprising a plurality of individual servers functioning together on a server network. Such a configuration advantageously services a large number of simultaneously executing client Home Dots. Whereas the client application or Home Dot provides for those services surrounding enabled or instantiated Dots, the server network and its applications as embodied in a web site, Java servlets, an RDBMS, Dot and Home Dot distribution support, provides for the development and distribution of Dots. Additionally, as the Home Dot performs the optional features of collecting statistics surrounding Dot usage and posting these statistics to the server, the server may aggregate these statistics for reporting. According to one aspect of the invention, the server operating together with the Home Dot, may source or enable messages to specific Dots based upon real-time context of user interaction with Dots. This function enables, for example, real-time context based advertising. (See also the Client-Server Protocols section of Appendix B.)

Method of Delivering Dynamic Web Data without Web Browser

With reference again to FIG. 6, according to one embodiment of the present invention, Home Dot application 200 enables users to collect Dots 120, 230, etc., organize those Dots into collections, manage the collections with organizational and workspace management functionality (e.g., categories, Snapshots, group-move), and easily share Dots, Dot-packs, and Snapshots with others. Also, the Home Dot application 200 implements and enables a Dot Messaging Architecture (DMA, discussed further below) providing messaging between Dots and the Dot server system.

When Dots are instantiated on a client machine, the Home Dot application 200 collects usage statistics (211, 212, 213, 214, 215) and keeps an event log (in XML format) that is intermittently sent to Dot application servers 153 and stored, for example as part of the Dot database 202 as use statistics 206. This enables the Dot server to track how the Home Dot application 200 and the Dots are being used and shared. In one embodiment this is implemented as a local MFC (Microsoft Foundation Class) application on the Windows platform, thus enabling rapid user response (no Internet delay for functional UI components). Home Dot application 200 functionality may also be provided across platforms (MAC O/S, Linux, unix, mobile, wap, etc.)

Home Dot Operation

Each user of a Home Dot application 200 has a Home Dot application login account 205 that accesses (step 303 of FIG. 7) a personal user profile stored on a Dot server 153 that stores the last state 212 of the Home Dot application 200 along with which Dots a user has collected 213, and how the user has organized their collection according to categories, Snapshots or packs.

When the Home Dot application 200 is launched, it queries the network for configuration information, enables a user to login, retrieves the user's profile from the Dot application server 153, and restores the Home Dot application 200 to the last state that was stored to the application server 153.

The method used by Home Dot 200 to access remote configuration information (again, step 303 of FIG. 7) creates a very flexible application that can be configured to support different application looks, different login sequences, dynamically by session and for each for each user. The user profile retrieved at login 303 enables the application to be personalized for a user, and allows that user to access that personalized application state on different client computers or devices 199.

Launching the Home Dot Application

When the Home Dot application 200 is launched, it reads the registry on the client machine to find the location of a configuration file (session-config). The session-config (XML file) directs the Home Dot application 200 to an application server using a URL as the server address that will handle its servlet requests. The URL points the Home Dot application 200 to a default graphic element (skin) and generic Dot graphic elements for controls such as the Title Bar 164 (FIG. 4), Bottom bar 166 (FIG. 4), etc. and it points to Dot definitions 213 for several default Dots, such as a Help Dot, Add New Dot, and Login Dot (i.e., System Dots that support the Home Dot application 200, as described further below).

For security, the session-config is served by a servlet method operating on the Dot application server 153 that only responds to authorized Home Dot applications 200. The session-config can also be served as a flat file from a standard web/local directory.

The session-config file contains a mechanism to redirect the Home Dot application 200 to another session-config file. This mechanism may look like:

<REDIRECT>="URL" attribute:

When the Home Dot application 200 reads the redirect attribute, it ignores the current configuration (session-config file) and attempts to retrieve the configuration stored at the redirect URL. The Home Dot application 200 will not redirect if this tag is omitted, if the URL is empty, or if the URL is the same URL used to retrieve this configuration in the first place. (This last state is recursive; therefore if redirection were carried out, the two configuration files redirect to each other, resulting in an endless loop within the Home Dot application 200.)

The session-config file contains a mechanism to force or provide an option to upgrade the Home Dot application. This mechanism employs a version tracking, such as:

<VERSION>="string" attribute:

This attribute is required and must match the version of the Home Dot application 200. According to one embodiment, if this attribute is omitted or differs from the Home Dot application's 200 version, the Home Dot application 200 will download the executable specified in the UPGRADE attribute and execute it. The mechanism for performing the upgrade may look something like the following:

<UPGRADE>="URL" attribute:

This is used only if the VERSION attribute differs from the Home Dot application's 200 version. This URL specifies the location of an executable that will upgrade the Home Dot application. The Home Dot application 200 will quit, then run the upgrade executable automatically.

System Dots

According to one embodiment of the present invention three system-level Dots are provided with a Home Dot: the AddNew Dot; the Help Dot; and the Login Dot. Dot definitions for these System Dots are referenced in the session-config. System Dots are Dot definitions that are not explicitly listed in the Home Dot application 200 or a user's ALL-CONFIG, but are accessible via the Home Dot user interface.

The AddNew Dot enables users to access the Dot Index through the Home Dot application 200 and find new Dots and Snapshots to collect. The Help Dot contains help content for the Home Dot application 200.

The Login Dot is what first comes up when the Home Dot application 200 is launched. It enables the user to login to the Home Dot application 200.

Sampling Dots—Trial Dots

One feature of the present invention is the ability to provide a user with the option to try, or sample Dots. According to one implementation of this feature, if a user doesn't have a Home Dot application login account (or is not logged in), then the Home Dot application 200 is in trial mode. Dots can be sampled (by clicking on Dot links 321) but not kept.

Keeping Dots

A user may decide to keep or not keep a Dot. According to one embodiment, to keep a Dot, a KeepMe Dot is displayed with Dots that are sampled (unique to Dot developer or provider) that informs the user that a Home Dot application 200 login account is required to keep the Dots. The KeepMe Dot has a mechanism (link) that enables users to create a new Home Dot application 200 login account 205 and keep the Dots by adding them to the new user's Dot definitions 213 or user-profile 310 (FIG. 7).

User Log In

Each Home Dot application user has a Home Dot application login account that accesses a personal user profile (stored server 153). When a user launches and logs in to the Home Dot application 200, it retrieves the user profile from server 153 and restores the Home Dot application 200 to the state in which the user left it, thus recovering their personal application experience. When the user logs out, their user profile is updated on server 153.

This mechanism enables different users to use the same client computer 199 and receive different application experiences or the same user to use different client computers or devices 199 and receive the same coherent experience. The application 200 restores itself to its last saved state no matter where a user may log in.

After the Home Dot application 200 retrieves its configuration information, it renders the Login Dot from the Dot definition specified in the SESSION-CONFIG. The Login Dot's Dot content asks the user for login and password, sends the login request to the Dot server servlet (also specified in the SESSION_CONFIG), and retrieves the user's profile required to restore the Home Dot application.

User Profile (<All_Config>)

A Home Dot user's profile holds the state of the user's Home Dot application 200 (size, position on the screen, which Dots were open) along with which Dots 213 the user has collected, and how the user has organized their collection (categories, Snapshots or packs). The profile is stored in an XML file called the user's <ALL_CONFIG>. The ALL_CONFIG file contains a SHARE and a LASTSTATE element as described below. The Share may look something like the following:

ALL_CONFIG's<SHARE> attribute:
Since a Share can contain Dots and Snaphsots, the Home Dot 200 uses the SHARE XML DTD to represent the user's collection of Dots and Snapshots. The LASTSTATE element may look something like the following:

ALL CONFIG's<LASTSTATE> attribute:
It contains a PRESET element 313 and a HOMEDOT 314 element (FIG. 7). The Home Dot 200 uses the PRESET XML DTD (Snapshot) to represent the Dot's that are left open. The Home Dot application element holds the position/size/state of the Home Dot itself. (See also the All_Config Example found in Appendix B.)

The Home Dot Application Server

The Dot application server 153 support much of the functionality of Home Dot application 200 (such as logging in/out, collecting, adding, and sharing Dots and Snapshots, Home Dot usages logging, etc.)

All communication 210 between Home Dot application 200 and the Dot application server 153 is secure and occurs over standard communication protocols (HTTPS). HTTP/HTTPS is chosen for the socket level client/server communication protocol because of its simplicity and more importantly, because most firewalls typically leave the default handling of the HTTP/HTTPS communication with the client.

The Home Dot 200 communicates to the server 153 via an HTTP request. The HTTP request URL contains an API call. Any API calls that require the uploading of data to the server place the data in the message body of the request. API calls that require uploading/downloading of data send/receive that data in XML format. All API calls are the end part of a complete URL that begins with:

http://<someservername>.DoDots.com/DoDots/ where <someservername> is variable and DoDots is an alias for the DoDots servlet/JSP servlet or servlets directory. Arguments to any of the methods are passed in as name value pairs in the query string portion or the URL.

The preferred embodiment of the Dot application server application that supports the Home Dot application 200 currently supports a number of servelt methods including the following:

AddUser

The adduser method is used to create a new Dot user account. Note that this is available as an end-user API to allow new users to add themselves rather than wait for an administrator to do it for them.

GetUser

The getuser method retrieves the user's own demographic data. This method supports the ability of the Home Dot application 200 to then allow updates to the user's demographic information using the setUser method (see below).

SetUser

The setUser method is used to update an existing user account. Note that this is available as an end-user API to allow existing users to update themselves rather than wait for an administrator to do it for them.

GetSession Config

The getsession Config method is used to retrieve general Home Dot application configuration information.

Set Password

The setPassword method provides a mechanism for the user to change their associated Dot server account password.

getMasterDotList

The getMasterDotlist method requests the list of all Dot templates known by the server 153. The server 153 returns a message body in predefined XML format (see the DOT_MASTERLIST DTD and example) of all possible Dots and their default template values. Note that included in each Dot element are a version stamp and dotclass ID's which allows the Home Dot application 200 to determine if it has the most up-to-date Dot template and Dot class binaries for that Dot. The Home Dot application 200 may then request the updated Dot template (see the getDotTemplate method) and/or dot-class binary zip file (see the getDotClassBinaries method).

setAllConfiq

The setAllConfig method sends, at 303, the entire body of user-specific client-side configuration information 310 including all Snapshots, Dots, general settings, etc. to the server 153 for persistent storage on behalf of the user. The user profile data 310 is sent as the message body in a predefined XML format (see the ALL-CONFIG DTD and example). The response returned by the server 153 indicates success or failure.

getAllConfig

The getAllConfig method retrieves, at 303, the last user-specific, server-side saved client side configuration information 310 (all Snapshots, Dots, general settings, etc) from the server 153. The data is sent as the message body in a predefined XML format (see the ALL-CONFIG DTD and example).

SetAll Events

The setAllEvents method sends, at 307, usage information (211, 212, 213, 214, 215, FIG. 6) that has accumulated since the last call to setAllEvents to the server 153 for later use in statistical usage report generation (for DoDots's own use). The data is sent as the message body in a predefined XML format (see the ALL-EVENTS DTD and example). The response returned by the server indicates success or failure.

GetDotTemplate

The getDotTemplate method requests from the server 153 a specific Dot Template (Dot definition) from the Dot database. The server 153 returns the XML that describes the Dot. This method is called when the Home Dot application 200 has determined that it does not have the current version of the Dot and the user wants the most recent version. (NOTE: this includes when the user is downloading the Dot for the first time)

Addshare

The addshare method stores at 302 a specific shared Dot(s) or Snapshot(s). The server 153 takes the XML that was uploaded by the Home Dot application 200 for sharing and returns the unique id of the share. The Home Dot application 200 puts the XML stream to be shared in the request body.

GetShare

The getshare method requests from the server 153 a specific shared Dot(s) or Snapshot(s). The server 153 returns the XML that was stored for sharing by the original sending user. The format of the returned XML stream is dependent on what has been shared.

Caching Layer

Returning to FIG. 6, the Home Dot application 200 may advantageously implement a caching layer 219 between its network requests and the network 210. The Home Dot application 200 sends network requests to the caching layer and the caching layer is responsible for completing those requests (retrying if necessary).

This is used in the event that the Dot application server 153 does not respond. If a user is attempting to log in and the server 153 does not respond, then the Home Dot application 200 logs in using a locally cached <ALL-CONFIG> (the last written user application state can be saved in the caching layer 219). If a user attempts to log out and the server 153 does not respond, then the caching layer 219 retries at a later time to write the logout application state to the server 153.

Add New Dots/Snapshots (Packs)

To get a Dot and invoke it—that is, turn it on—the Home Dot application 200 requires the Dot's definition (XML file with the information necessary to instantiate a Dot and point it to Internet content). With reference again to FIG. 7, a user collects Dots from multiple sources: by clicking on Dot links 321 (Internet link to a Dot's Dot definition) and/or by receiving a Share 320 (Dots and Snapshots shared from other users). In both cases, the Dot definitions for the Dots involved are hosted and served by a Dot application server 153.

Users can find Dots (Dot links) in the Dot server 153 DotIndex 204 (online Database of Dots via a web browser or the AddNew Dot) and/or promoted on a content provider server 155, e.g., via a web site. When a user clicks on a DotLink 321 and the Home Dot application 200 is installed, the Home Dot application 200 retrieves the Dot definition that the DotLink 321 points to, adds it to the current user's ALL-CONFIG file 311 of user profile 310, and turns the Dot on 324. The Dot instantiates the UI and begins filling it with the Dot content (Internet content) as defined in the Dot definition.

Once a user receives a Dot, the Home Dot application 200 saves the Dot's definition as part of the user's ALL-CONFIG file 311. Because a Dot definition becomes part of a user profile 310, it can be modified by use e.g., its default TitleBar image 132 may be changed or its WebConduit control may be navigated to a different URL using DMA messages. The Dot will pick up where it left off next time it is turned on.

Dots can also be received in the form of Shares. A Share 320 is a XML file that represents a collection of one or more Dots and/or one or more Snapshots. A Share 320 may be shared, for example by attaching a Share Link 320 to a standard email message. When a user receives an emailed Share Link 320 from another user and clicks on the Share Link 320 in the email:

The Home Dot application 200 retrieves the share XML file from the Dot application server 153 using the getshare servlet method to which the Share Link 320 points.

The Home Dot application 200 parses the share package and adds the new Dots and Snapshots to the Share recipient's ALL-CONFIG 311. The Share recipient can now turn on any Dot and Snapshot received as part of the share.

According to one embodiment of the present invention, every Dot that a user gets is added to and becomes part of the user's ALL-CONFIG 311 and becomes accessible to the user anywhere they can login to a Home Dot application 200. According to another embodiment, a user is provided with the option to keep or discard a sampled Dot prior to adding it the user's ALL-CONFIG 311.

If the Home Dot application 200 is not installed on a client computer 199 when a user first attempts to get/receive Dots, then the Home Dot application 200 is downloaded and installed with the first Dots that are received. From that point forward, the client machine 199 is Dot-enabled and the user is not required to download and install the Home Dot 200 again (subject to updates). This method removes the alternative approach known today in the art which is to download a custom client application from each company's web server 105 that is visited.

Once a client machine 199 is Dot-enabled, (i.e. the Home Dot application 200 technology installed), then every time that a user clicks on a Dot link 321, the Dot 120 pops up immediately (faster than it would take to load a small web page). Rather than download and install software for different Dots, only the Dot definitions 102 which are packaged web readable content is collected.

Dot Categories

The Home Dot application 200 enables users to organize Dots that they have collected (in their ALL-CONFIG 311) by categories. A Dot can be a member of more than one category. Alternatively, a Dot is not required to be categorized (i.e., set attribute categorized=uncategorized). The Home Dot application 200 enables the user to Add/Remove/Rename categories and edit a category's contents (those Dots that are members of that category). Categories may also be assigned by the Dot creator (which may or may not be overwritten.)

In the preferred embodiment, Dots keep track of the categories to which they are members (e.g., there is no master category list). The categories to which a Dot belongs are added to the Dot's definition (in the user's ALL-CONFIG 311).

The Home Dot application 200 has one unique category: the ALL MY DOTS category (users cannot rename or remove this category). This category contains all the Dots that the user currently has in their collection (in their ALL-CONFIG 311). Removing Dots from the ALL MY DOTS category removes it from ALL-CONFIG 311. A user can duplicate a Dot from within the ALL MY DOTS category in the event they want two of the same Dot (e.g., 2 stock watching Dots—one for monitoring a first security, and the other for tracking a second security).

Managing Dots

Figure 12A:
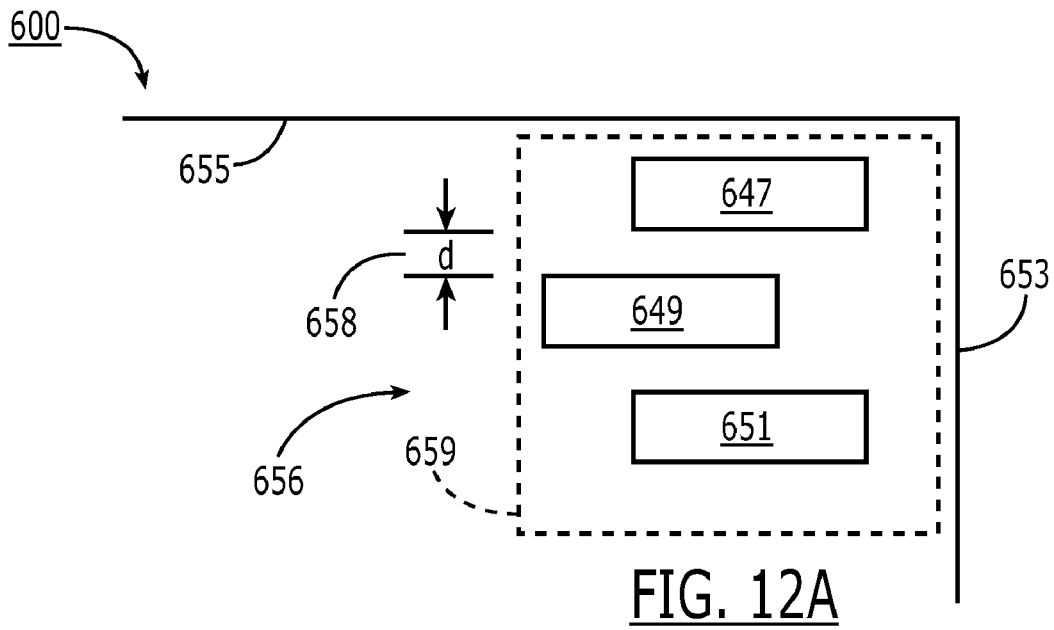
FIGS. 12A, 12B, and 12C are illustrations of Application Media Packages arranged in groups, and arranged in vertical and horizontal Blocks (position-justified groups), respectively, according to an embodiment of the present invention.
Figure 12B:
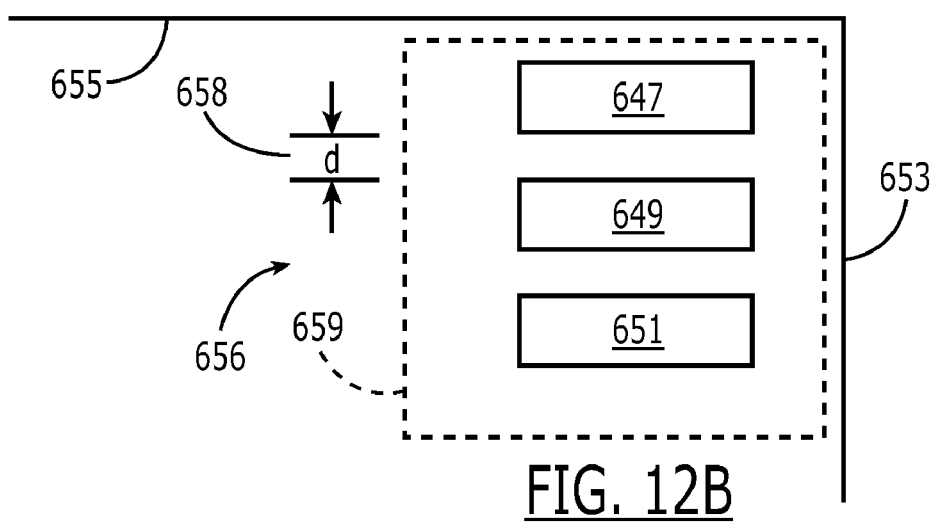
Figure 12C:
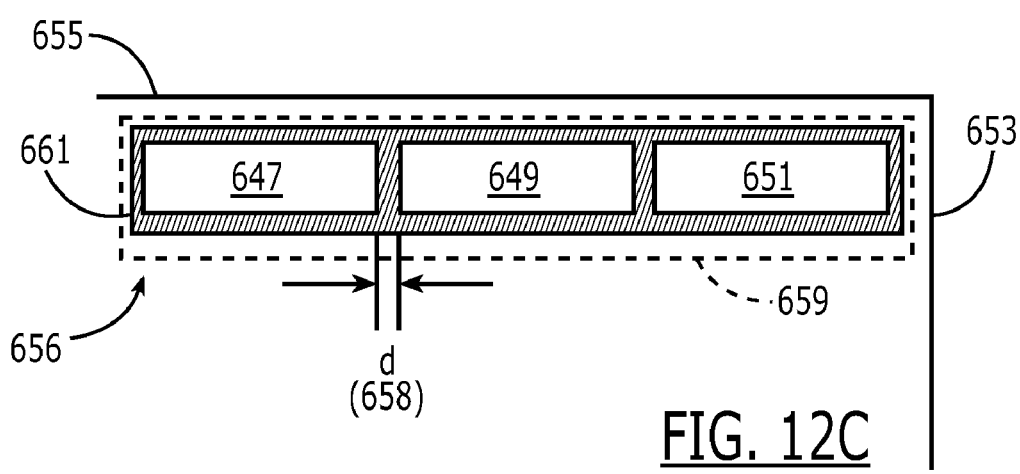

The Home Dot application 200 provides for several features enabling visually organizing, collecting, and working with Dots 102 individually and as a system. Referring to FIGS. 12A, 12B, and 12C, a series of drawings depicting a user interface 600 for the organization of Dots on a computer desktop is shown.

To improve ease of use when working with Dots in groups, the Home Dot application 200 enables users to capture an image, or Snapshot, of a workspace that they have defined with Dots. Such Snapshots may include, for example, which Dots are on and where they are positioned on a display screen 656. Users can instantly recall these Snapshots to restore the previously defined set of Dots to their captured locations on screen 656.

Snapshots can be created to support different work tasks (e.g., morning news pack, web development pack), different user groups (e.g., small business pack, runners health pack, school study pack), or different activities (e.g., day-trading, dream team sports tracking). Within a Snapshot may be user-created Share Packs 659 (groupings) of Dots (created, for example, using Share Links 320). In addition, Dot developers can create and publish Packs, which are groups of Dots designed to work together or which may be of similar/related interested to a user, and online content providers can offer their users pre-made Packs.

Users can easily and quickly create and configure/reconfigure their own aggregation of content and functionality as Dots, thus providing a user-aggregated content/application system. This is significantly different than current Internet functions of offering users "My-" versions of a full-screen Internet site in which the choice of content, arrangement, presentation style, etc. are quite limited.

Dots may be aggregated together and manipulated as a block. Blocks are defined as linear clusters of Dots (snapped together vertically or horizontally). An example of a group 659 of Dots 647, 649, 651 not in a block is shown in FIG. 12A. That is, in FIG. 12A the group 659 of Dots are not aligned with one another with reference to either a horizontal or vertical axis. Two examples of the Dots 647, 649, 651 comprising group 659 arranged in a blocks are shown in FIGS. 12B and 12C, respectively.

Blocks of Dots have an orientation: vertical (Dots snapped to each other in a vertical column as in FIG. 12B) or horizontal (Dots snapped to each other in a horizontal row as in FIG. 12C). In one embodiment, the Home Dot application 200 or Dots (647, 649, or 651) expose a UI mechanism (e.g., CTRL+O, see slamming) to enable users to change the orientation of Blocks of Dots.

Blocks of Dots can have a justification. When a block of Dots are "justified", they share a common edge such that all edges on one side of the Dots are lined up. For example, a vertical block of Dots all snapped toward the right side of the screen 653 is right justified as shown in FIG. 12B. In one possible embodiment, the Home Dot application 200 or the Dots exposes a UI mechanism (e.g., SHIFT+CTRL, CTRL+J, see slamming) to enable users to change the justification of Blocks of Dots (left, center, right).

Slamming blocks of Dots against screen edges (653, 655) or other window edges is used as a mechanism to alter the justification and/or orientation of a Block of Dots. For example, a user may slam a horizontal block against the left edge of the screen and the Block's orientation could swing vertical and justified to the left with all Dots snapped to the left of the screen. Likewise, a horizontal block that is bottom justified may be slammed against the top edge 655 of the screen changing it to a top justified Block.

One feature provided by an embodiment of the present invention to assist a user with the organization and presentation of Dots is the snap feature. A Dot (649 for example) "snaps" to other Dots (647 and 651 for example), other windows (not shown), and screen boundaries (edges) 653, 655. When Dots 120 are dragged (moved) near an edge (653 or 655), a magnetism behavior is exhibited and the Dot 649 accelerates towards and "snaps" to that edge (653 or 655). The present invention provides for a magnetic gap 658 such that even when Dots are snapped to edges, there still exists a gap (~5 pixels). This gap is supported so that the user may easily visually recognize independent Dots.

The snapping feature simplifies the task for users to quickly and neatly align Dots. (See FIGS. 12B and 12C). When Dots (647, 649, and 651) are snapped together and a Dot is collapsed or resized, then a Dot that is snapped to another Dot can move accordingly; for example, staying snapped or not, according to user preference.

The user interface of the present invention supports the movement of Dots (647, 649, or 651) in clusters. All Dots (647, 649, or 651) that share an edge (snapped together=cluster/group) can be grabbed and moved as a group 659 (which may, but need not be, a block).

The present invention teaches multiple methods of selecting a cluster of Dots 659 (as opposed to a single Dot 651 for example). The simplest method comprises of pressing the CTRL key before grabbing a member Dot (any one of 647, 649, or 651) of the cluster 659. This method selects the entire cluster and moves all Dots 120 as one unit.

Another way is to change the user's selection, that is which Dots (647, 649, or 651) in the cluster 659 are selected for moving, by the number of times a user clicks before grabbing a member Dot (647, 649, or 651) of the cluster 659. For example:

0 clicks before grabbing a member Dot (647, 649, or 651) selects and moves the entire cluster 659 of Dots.

1 click before grabbing a member Dot (647, 649, or 651) selects and moves just the member Dot.

Additional clicks could select all vertical, all horizontal, etc.

The present invention provides for a unique method of indicating which Dots (647, 649, 651) in a cluster 659 are selected (for a group action such as move, or minimize). When multiple Dots are selected (by either method: CTRL+Select or Click+Select), a halo 661 appears around the selected Dots. In one embodiment halo 661 (shown only in FIG. 12A) is a contrastingly shaded or brightly colored line (~3 pixels wide) floating around the outer perimeter edges of the Dots selected (647, 649, 651) in a cluster 659. The halo remains visible as the Dots (647, 649, 651) are moved.

Dot Sharing

The Home Dot application 200 provides methods for users to easily and quickly Share the Dots that they have collected and the Snapshots that they have created with others. An exemplary delivery mechanism is email. The user's default mail client application is used (a user can use their existing address book and add a detailed message); a web-based mail service extended through the Home Dot application 200 or Dots may also be used. To share and convey shared Dots or Snapshots in an email, a Share Link 320 is required (an Internet link that points to stored Share data on the Dot application server 153).

When a user sends a Share or Snapshots to another user:
1) A Share XML file 302 is constructed employing the shared Dots and Snapshots from the sharing user's ALL-CONFIG 311.
2) The Share XML file 302 is stored in Dot database 202 on Dot application server 153 in exchange for a unique shareID (using the addshare servlet method).

3) An email is constructed with a Sharelink 301 (an Internet link that points to the stored Share) and placed in a new email using the user's default mail client.

When a user receives a Share of Dots/Snapshots from another user and clicks on the ShareLink 320 in the email:
1) The recipient's Home Dot application 200 retrieves the Share XML file from the Dot application server 153 (using the getshare servlet method) to which the Share Link 320 points.
2) The Home Dot application 200 parses the Share package and adds the new Dots and Snapshots to the Share recipient's ALL-CONFIG 311.

The Share recipient can now turn on any Dot and Snapshot received as part of the Share. Because the Share was constructed from Dot definitions that were part of the Sharing user's ALL-CONFIG 311, the recipient receives the Dots just as the Sharing user had configured them at the time of building the Share.

Preferred Embodiment of Client/Server System

Figure 13:
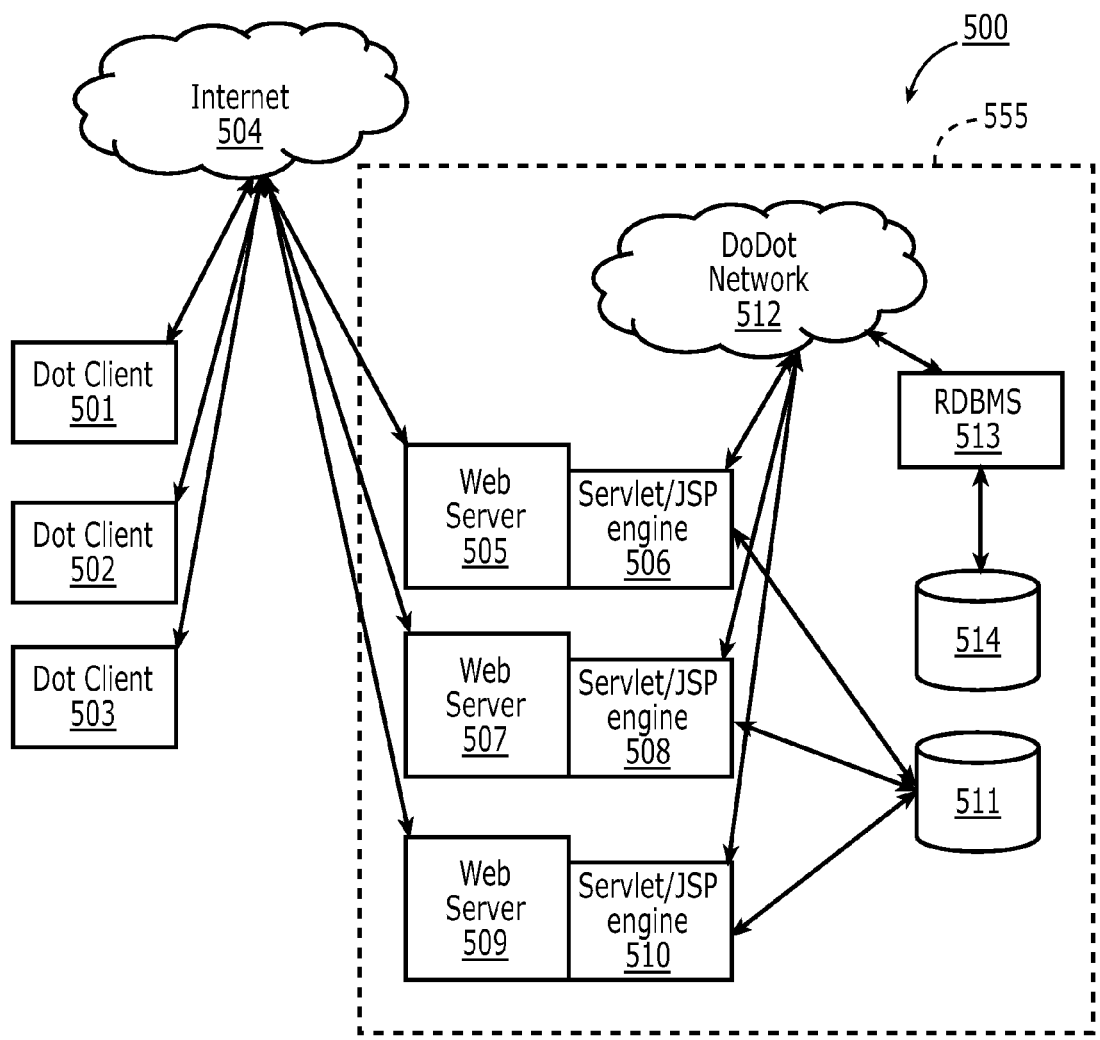
FIG. 13 is an illustration of the client-server model of a system according to the present invention.

The client/server model 500 of the preferred embodiment is described to according to FIG. 13. Paramount for the successful implementation of a consumer or high volume system is the proper separation of responsibilities between Dot clients (501, 502, 503) and the Dot server system 555. The architecture presented herein supports the primary operations of Dot distribution, client installation, use statistics collection, as well as Dot developer activities. These operations, as described above, are supported in part by the XML structure and calls as listed in the attached appendices A and B. It will be appreciated by one skilled in the art that the list is not exhaustive but descriptive of an implementation of certain features of the present invention.

The Dot server system 555 which is required for support of the general Dot functionality provides for persistent storage and retrieval of configuration and statistical (usage) information and for intelligent software upgrade service for the Dot clients 501, 502, 503. Users are required to logon to the Dot server system 555 with a username and password to access this information. The server 555 also provides for generating statistical analysis reports. The server 555 is used to provide small, persistent data storage areas for third-party Dots. The server 555 may be maintained by a single administration entity and does not require third-party Dot providers for its support. The content contained by the Dot however, may be provided by the third party developers, with the initial content optionally being supplied by existing or re-purposed web pages served by the third party web servers. An administrative interface is therefore provided according to the present invention which is used by the administration entity to maintain the software upgrade information, manage users and generate statistical usage reports.

The software portion of Dot server system 555 consists of several architectural components, including:

Web servers (505, 507, 509), Servlet JSP Engines (506, 508, 510) which maintain a Java based XML Parser with SAX (Simple API for XML) and DOM (Document Object Model) interfaces, all of which share a common file system, and at least one Relational Database Management System (RDBMS) Server 513 which supports the RDBMS file system 514.

According to one embodiment of the present invention, there are no specific operating systems, application server, or database server constraints placed on the server 555 (e.g. the operating system (O/S) may be NT, Solaris, HP-UX, Linux or FreeBSD, or any other viable server O/S. The RDBMS may be Oracle, Sybase, Informix, SQLServer etc.).

The client and server transmit and receive data on the internet 504 in XML format over standard HTTP/HTTPS. An XML parser residing on the Servlet JSP Engine (506, 508, 510) assists in deconstructing and reconstructing the XML into and out of the RDBMS Server 513 when the XML stream contains information that is needed for report generation. XML parsers with DOM and SAX interfaces are freely available for most major programming languages. HTTP/HTTPS, and therefore a web server (505, 507, 509), is chosen for the socket level client/server communication protocol because of its simplicity and more importantly, because most firewalls typically leave the default TCP ports for HTTP/HTTPS (ports 80 and 443 respectively) unblocked.

The Web servers (505, 507, 509) provide the default handling of the HTTP/HTTPS communication with the Dot client 501, 502, 503. The Servlet JSP Engine (506, 508, 510) functions as an in-process extension of the Web servers (505, 507, 509) and provides the infrastructure for the application logic layer (servlets) and the presentation layer (Java Server pages). Servlet/JSP is chosen over the architecturally similar ASP due to consideration in performance, maintenance costs, and the variety of O/S and application server vendor choices.

The persistent storage mechanism for everything except the binary software components (client component updates) is Relational Database Management System (RDBMS) 513. The binary software component for client updates are stored in the file system 514 with a pointer (full pathname) which is stored in the database to each component file. The binary software components are not stored directly in the RDBMS in so as to improve performance.

Since the configuration data need not be manipulated or reported on by the server, the configuration data is stored directly in the RDBMS 513 as a small text file, in the form by which it is transmitted from the client 501, 502, 503. The configuration data is not deconstructed and reconstructed into its constituent parts by the XML parser on the servers (505, 507, 509). The statistical data is used to generate reports on the server-side by a servlet JSP-based administrative interface. SQL queries are used for statistical report generation to provide simplicity and flexibility. Therefore, a single statistical data XML stream is deconstructed upon receipt by an XML parser residing on the Servlet JSP Engine (506, 508, 510) and stored as discrete RDBMS columns (the entire stream instance is the RDBMS row) rather than storing the entire stream in a single text column.

Development and Testing of Dots

It is possible to provide for the development and testing of new Dots, Categories, Packs, etc. in a physically separate system that is a superset (duplicate with additional testing support) of the production system 500. The development and testing (dev/test) system has additional server methods and interfaces, not present in the production system 500 which requires higher security and simplified maintenance, to facilitate the development and testing process. The interfaces to these additional server methods are HTML/JSP pages to allow for easy accommodation of new, geographically distributed Dot content providers.

The development and test system allows the Dot content providers to easily build and test new Dots and Dot Packs. When tested to their satisfaction, the Dot content providers can then, through the interface, submit their Dots/packs for inclusion in the production system. The Dot administrator will be able to periodically run a report to see which Dots/packs were submitted. The Dot administrator is then able to decide whether or not to approve a Dot/pack for import into the production system. Migration of an approved Dot/pack will involve exporting the appropriate data from the RDBMS on the development and test system, moving the export file from the development and test system and importing the export file into the production system.

Dot Messaging Architecture (DMA)

Dots and the Home Dot application have a messaging architecture (Dot Messaging Architecture—DMA) that enables elements of the system including Dots, controls within Dots, and the Home Dot application, to communicate with one another. This enables these elements to exchange information, request actions or functionality, and respond to system, element, or content events.

Figure 14:
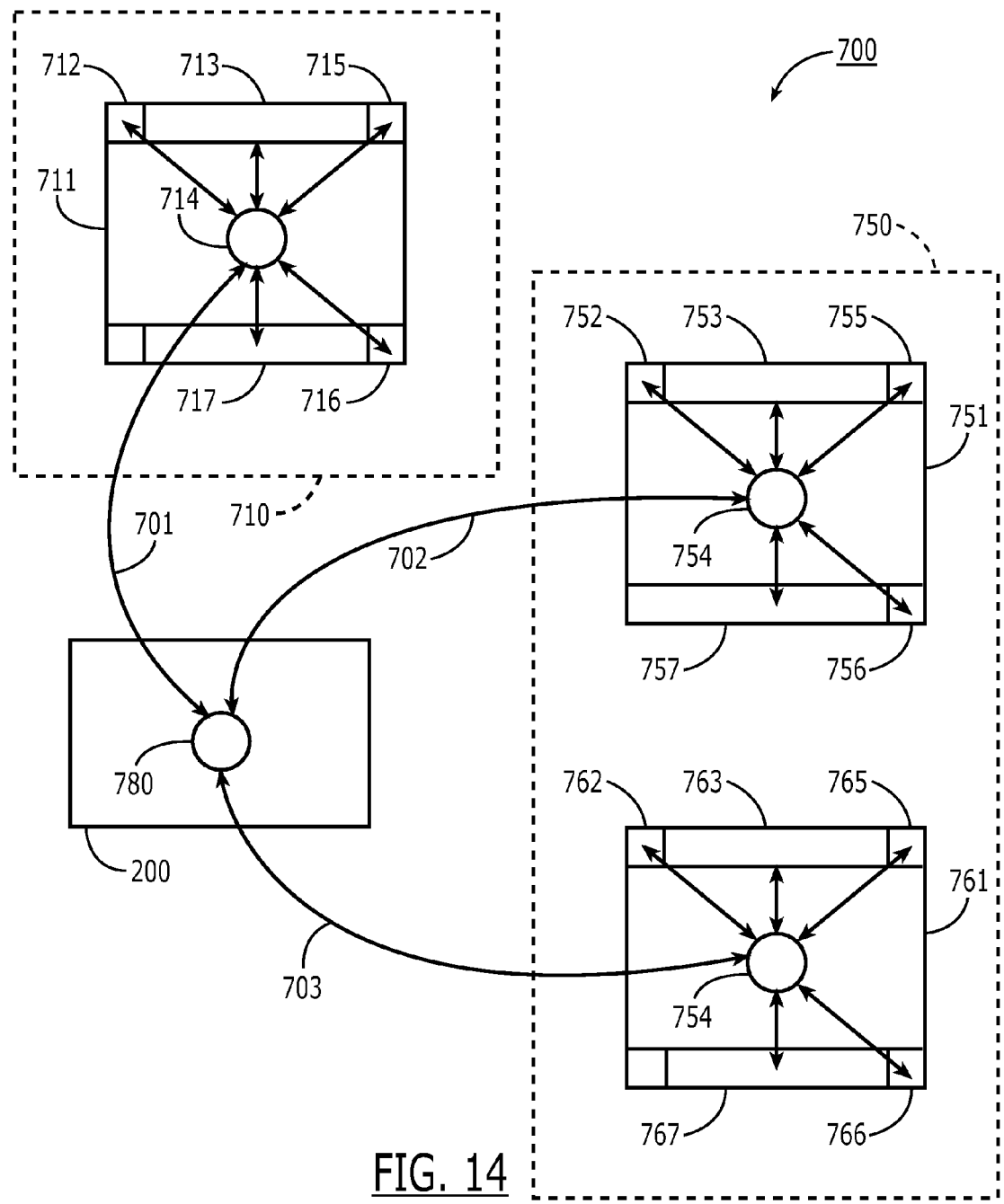
FIG. 14 is an illustration of the message routing paths and elements of a Dot Messaging Architecture according to the present invention.

FIG. 14 illustrates the message routing paths and elements 700 of the Dot Messaging Architecture. The Dot Messaging Architecture (DMA) has a messaging addressing and routing scheme, defined messages, and an extensible message format (as defined in further detail below) that provides each component with access to component, application, and system features and true application behavior. Also, Dot content has access to the application rendering system within the Home Dot 200 and other Dots (711, 751, 761) via the DMA.

All elements of the system can send and receive (via paths 701, 702, and 703) DMA messages. In this embodiment, these elements fall into three groups: the Dots (711, 751, 761); the Controls in the Dot's control space including the WebConduit control (714, 754, 764) and base controls that encompass menu controls and window operations controls; and the system control 780 embodied within the Home Dot application 200.

The DMA enables controls to send and receive messages. Controls can exchange messages with other elements in the same Dot (controls in the control space, Dot frame, System) or in a different Dot (the addressing scheme supports addressing elements in other Dots. All Dot controls share a set of common messages. They also can provide messages that are unique to that control (see WebConduit Control). Common control messages include messages such as:

show
hide
get-width
get-height
get-size
is-open
get-address

These messages query/effect properties/methods of a control within its Dot's control space such as layout, size, etc.

The Web Conduit control (714, 754, 764) supports additional messages (in addition to the common control messages explained previously). These unique Web Conduit messages enable other elements in the Dot System (Controls, Dot frames, Home Dot application 200) to interact with WebConduit functionality (request actions or functions, and respond to events). Messages unique to the WebConduit control which is a wrapped Microsoft IE web control in the preferred embodiment, include:

<any javascript>
navigate.

One of the most significant features of the WebConduit control is that DMA enables messages to flow IN and OUT of standard HTML rendered within a control. The preferred embodiment currently extends DHTML and javascript to send and respond to DMA messages. The present invention supports SendMessage (a synchronous method which is used if return result is required) and PostMessage (an asynchronous method in which no return result required) methods that can be called using a window.external.<method> call from DHTML in the Web Conduit control (714, 754, 764).

The preferred embodiment of the message format (explained in more detail in the following sections) allows for two types of messages to be sent IN and OUT of HTML with respect to the WebConduit control. Specific messages and functions can be called (e.g., #navigate) that cause a WebConduit to perform a specific action or function. In addition, any javascript (e.g., ##<any javascript>) can be called within a WebConduit's document as well.

This provides the messaging architecture with exceptional flexibility and extensibility in which data can be passed, functions can be called, and variables can be set. Integrating DMA with standard Web content by enabling DMA messages to call into HTML and for DMA messages to be initiated from HTML within the WebConduit control is the basis that enables Dots to exhibit true application behavior.

Any DMA message that is defined can be sent or called from DHTML. This, in conjunction with the application logic capability that is provided by javascript (and other HTML scripting languages), provides the application media development environment (which includes application development platform and language). A Dot developer can thus author a new Dot application by developing web content (HTML, GIF files, etc.) and by packaging that content in a Dot Definition, eliminating the need for compilers and consequently, downloading executables. Therefore, if a client device 199 has been Dot-enabled (the Home Dot application 200 is installed) then that device can instantaneously view, open, run Dots as well as modify and save their configurations.

DMA messages can be sent to and received from a Dot. This enables elements of the system that can send and receive DMA messages to interact with a Dot. Elements of a Dot's definition can be accessed/modified using Dot messages. Examples of Dot Properties/Dot methods that can be accessed and modified via the DMA include:

set-title
get-title
set-size<width><height>
is-open
close
collapse
uncollapse
set-title-images <up-URL><down-url><over-url><inactive-url>

Since a message can originate from DHTML content which is rendered in the Web Conduit control as Dot content, standard web content when rendered in a Dot can therefore access properties and behaviors of its packaging (the Dot). Internet content can therefore do such things as modify the size of the Dot that is rendering it. It can move it or collapse it.

The present invention therefore enables properties and behaviors to be tied to and between any Dot content event, even outside of a Dot affecting another Dot (e.g., an internet content (DHTML) mouse-over event can change the size and position of another Dot, etc.)

Most of the DMA examples thus presented are of other elements sending messages to the Dot frame (711 for example). An example of a Dot frame 711 sending messages can be seen in the case of the menu control 712 (discussed further below). The Dot frame 711 may also send messages (as can the menu control 712) based upon the occurrence of certain events such as Dot-moving, Dot-collapsed/expanded, Dot-infocus/inactive, etc.

The preferred embodiment has the menu control 712 implemented as part of the Dot Frame 711. Menu control 712 entries are given/tied-to actions using the DMA. Each menu entry may consist of, inter alia, a text-title, an icon, a tooltip, an ID, and an action. The action is simply a DMA message that has a recipient specified address. Dot menu control 712 items are defined as part of a Dot definition.

When a menu entry within a menu control 712 is selected by a user, the specified Dot Message is sent to the specified recipient (DMA address). This illustrates an example of the true application behavior that is exhibited by Dot Content having access to DMA.

As with the functionality described in the previous sections, the following are examples of types of additional application behaviors that are possible:

- A menu control 712 entry (e.g., refresh) can send a message (to refresh) to a Web Conduit control and cause an action (e.g., refresh content).
- A menu control 712 entry can send a message to the Dot (itself) and cause it to collapse, or resize, or exit.
- A menu control 712 entry can call any javascript (##<any javascript>) in the HTML of Dot content rendered in the same Dot or a different Dot to set variables, change images, call functions, etc.

DMA messages can also be sent to and received (701, 702, 703) from the system (720)—the functional layer above and between individual Dots. Some aspects for which the system is responsible include DMA message routing, adding, removing, opening, closing Dots, etc. In the preferred embodiment, the system includes the Home Dot application 200 or equivalent Dot-rendering and Dot-management client application.

Examples of system functions and behaviors that can be accessed and called using DMA messages include:
 #refresh
 #install-dot <dot-url>
 #have-dot <dot-address>
 #delete-dot <dot-address>
 #quit
 #save-to-server
 #get-screen-width
 #get-screen-height
 #close-all-dots
 #open-preset <preset-name>
 #take-preset <preset-name>
 #get-dot-ids <dot-address>

Messages can be sent to/from controls (WebConduit control—in and out of HTML), to and from the Dot (DotFrame—menu control 712, Titlebar 713, bottom bar 717, flexible Dot Definition), to and from the system (Home Dot application 200—open and close Dots, system variables and data). The DMA addressing scheme also provides for messages to be sent to any Dot, to any control in any Dot, to any HTML, in any control, in any Dot. This enables Dots to work together as an application system, enables Dot developers to share functionality and leverage and build on the functionality of other Dots.

In the preferred embodiment, a DMA message has two components: a recipient address and the message body itself. Both are represented as strings. The addressing scheme is explained in the next section.

The body of a DMA messages is, at its simplest, a text string which may represent any javascript, for example, sent to a Web Conduit control. For defined messages, there is a method element to define the function/behavior call/request [e.g., #set-size] followed by arguments if the method element requires them (e.g., height in DotUnits; width in DotUnits).

The present invention provides for two functions that enable messages to be generated from within DHTML in the WebConduit control: SendMessage and PostMessage. SendMessage, which is synchronous, is used if a return value is required. PostMessage, which is asynchronous, is used otherwise.

Below are examples of messages generated with DHTML within the WebConduit control:
 window.external.PostMessage ("#.:", "#set-position 350 500")
This message is sent to a Dot and causes it to move to a new screen position, for example 350×500 pixels.
 window.external.SendMessage ("#system, "#get-screen-width")
This message asks the system for the current screen's width in pixels.

Messages are routed according to three pieces of information: Domain, Dot Specifier, Control Specifier.

One of the ways that a Dot is identified is by a Domain. In the preferred embodiment, the Domain is the same as a Dot provider's ID (developer ID). Generally this is a unique identifier for each company or developer and is specified in a Dot's definition.

Dots in the same domain, by default, can communicate to one another without explicitly specifying the domain in the address. When no messaging access restrictions are placed on addressing a Dot according to its domain (by default there are restrictions), then a Dot can also send messages to another Dot belonging to a different domain by explicitly addressing that Dot by its domain and Dot specifier.

Dots are further identified with a kind attribute as a part of the Dot Definition, and by an ID attribute. The ID is volatile and is not typically hard-coded into DHTML scripts. The addressing scheme allows for a Dot to be specified by explicitly referencing or querying a Dot's kind or ID identifier attribute.

Similarly, controls are identified by kind and by ID (also a part of the Dot Definition). Controls can also be specified by explicitly referencing or querying its kind or ID.

In the preferred embodiment, there are several permitted forms for the address of a message recipient. The fundamental one is:
 #<dot specifier>:<control specifier>
Other accepted address forms are:
 #<domain>:<dot specifier>:<control specifier>
 #<domain>:<dot kind>:<dot id>:<control kind>:<control id>
 #system
If an address does not match any of these forms, the address defaults to #system.

Specifiers have four different forms: The first form specifies the unique ID of the Dot/control/domain in question. An example of this first form is:
 <specifier>:=<ID>
The second form allows the sender to address a message to the closest matching recipient by some form of search criteria. Multiple Dots or controls might be of the same kind, enabling broadcasting a message to these elements. An example of this second form is:
 <specifier>:=<kind><#search criteria>
Search criteria can be one of:
 <search criteria>:=any
 <search criteria>:=open
 <search criteria>:=closed
Controls that are hidden are considered closed, and controls that are visible are considered open.

The third form enables reference to a specific Dot or control, allowing messages to be sent within a Dot. If a particular control is specified, then it must be specifically referenced in the Dot. An example of this third form is:

<specifier>:=dot

The final form is specifically for the control specifier. If a message is to be directed to a Dot and not a control, the control specifier must be empty. An example of this last form is:

<specifier>:=

The current embodiment supports messages to a specific recipient: the addressing/routing scheme could support messages addressed to multiple simultaneous recipients (broadcast). Similarly, Dots can address Dots on the same platform or client (computer or device); the addressing or routing scheme may also support messages addressed to Dots/Controls/Home Dot applications 200 on other devices or by user. The Home Dot application 200 routes messages sent between Dots (711, 751, 761) and resolves addressing queries (e.g., address: "#A#Any:"=first Dot of kind "A" found in the Home Dot application 200).

Since the Home Dot application 200 routes messages between Dots (711, 751, 761), it can allow or restrict Dots from addressing and sending messages to other Dots outside their own domain (the Home Dot application 200 could also restrict messages to within the same Dot). For example, Dot2 (751) is a member of domain B (750) as is Dot 3 (761), whereas Dot 1 (711) is a member of Domain A. Home Dot 200 can permit or deny messaging between Dot 1 (711) and Dots 2 and 3 (751, 761) and vice versa.

The Home Dot application 200 acts to enforce the access rights to and between published messages built on the DMA API. In one embodiment, the Home Dot application 200 accesses a database of published message methods implemented by Dot Developers and restricts/allows messages to pass based on access criteria data posted to the data base.

For example, a Dot developer could specify 2 public functions, 2 functions with access restricted by partner (Domain 710 or 750 for example), and 2 functions with access restricted by Dot address. The Home Dot application 200 may allow or restrict messages to be sent to one Dot from other Dots according to access criteria specified by the Dot developer.

The Home Dot application 200 also responds to messages sent to #system. Access to system features/functions/behaviors is one aspect of the present invention that enables extensibility of the Home Dot application system.

System messages include:
REFRESH—Refreshes the user's ALL-CONFIG 311.
INSTALL-DOT<DOT-URL>—Adds the specified Dot to the user's Home Dot application 200 (ALL-CONFIG) using the same mechanism that Dot definitions are added to the system.
HAVE-DOT<DOT-ADDRESS>—Checks if the user currently has the specified Dot in their Home Dot application 200 (as part of the ALL-CONFIG).
DELETE-DOT<DOT-ADDRESS>—Removes the specified Dot from the Home Dot application 200 (and the user's ALL-CONFIG).
QUIT—Quits the Home Dot application 200.
SAVE-TO-SERVER—Saves the user's ALL-CONFIG to the Dot application server 153.
GET-SCREEN-WIDTH—Returns the width of the screen in pixels.
GET-SCREEN-HEIGHT—Returns the height of the screen in pixels.
CLOSE-ALL-DOTS—Closes all open Dots.
OPEN-PRESET<PRESET-NAME>—Opens the specified user's Snapshot.
TAKE-PRESET <PRESET-NAME>—Capture a Snapshot.
GETDOT-IDS <DOT-ADDRESS>—Returns the DotID of the specified Dot.

Statistics Collection/Analysis

The Home Dot application/Dot system and method of collecting use statistics from Home Dot applications (and application servers) enables the present invention to build and query a multidimensional use-profiling database. Because Dots are used in groups and used more often for longer periods of time than web pages/sites, the present invention may collect real-time multidimensional use statistics 206 (according to which Dots are ON, for example together or simultaneously) that over time becomes a valuable multi-dimensional user behavior profiling database. The Dot server 153 collects use statistics 206 from its Home Dot application 200 on clients 199 and manages and tracks Home Dot application downloads, access to Dot Index 204, etc.

Information on a Dots user can be monitored in a multi-dimensional fashion. Instead of classifying a user based solely on their demographic characteristics and linear use of the internet, the present invention enables tracking on an additional dimension. A user can be classified according to which Dots they use at the same time, instead of only how they navigate within an individual viewer (the browser). This user information can be packaged and sold to content providers so that they can better provide services to their users.

Because the present invention enables multi-dimensional profiling, a service may be provided by the operator of this system and its partners to customize advertisements and offerings to users in a more efficient and targeted manner. Tracking this profiling data in real-time allows the operator to tailor these offerings to users of specific Dots in a way that is not otherwise possible today. For example, one content provider partner can be informed that users of a certain Dot are also disproportionately monitoring content about a specific topic through another Dot. This information is then used to target ads at the moment the peripheral interests of that content providers Dot users are known. The present invention enables this information to be tracked as a complete system. The system can be utilized to facilitate serving advertisements and offerings based on the information that it collects.

The Home Dot application 200 records application events in an XML log that intermittently gets uploaded to the Dot application server 153. Application events that are logged include the following (by timestamp and by session):
When a Dot is opened and when it is closed (particularly, when Home Dot 200 is opened and closed)
When a Dot is added from a Dot Template or a Share
The number of times a user clicks through from a Dot to a full-screen web page (and to which URLs)
The number of page views in a Dot-by-Dot session
When and from which URL did a user download a Home Dot application 200

The following outlines the types of questions the use statistics of the present invention can answer regarding Home Dot application 200 and Dot use:
Duration and frequency of opening Home Dot applications and Dots—How often is the Home Dot application 200/Dot used on average (optionally, by user group) during the parts of a day (e.g., morning)?
Duration: What was the average amount of time that users leave the Home Dot application 200/Dot ON 324 during the day Distribution of Home Dot application 200 and Dots (Point of Distribution including Shares)—How many users have downloaded the Home Dot application during a set period of time? From which URL were they referenced?

How many times has this Dot's DotTemplate been installed (from the DotIndex)?

From which web site were users referred? How many times has the Dot been installed from a Share?

Page views in Dots, Click-throughs/URL's—How does the page-view performance of a Dot compare to the comparable content on a full-screen web site?

List the full-screen URLs most often clicked through to (in ranking order) from this Dot.

Dots used in Groups—Which Dots are used most frequently together?Which Dots do users most often use with Dot.

The Home Dot application 200 intermittently sends its event logs to the Dot application server 153 using the setAllEvents servlet method. The Home Dot application's events are logged and sent as an XML file in a format specified by the CALL-EVENTS.

Categorizing Dots and/or Dotcontent by "context keywords" (e.g., CNN Dot and FoxNews Dot="News"; CBS Sportsline Dot="Sports") enables the Home Dot application 200 to build a real-time (accessible via the DMA) multi-dimensional use context on-the-fly, based on which Dots the user currently has ON (e.g., assemble the keywords of the currently open Dots into a multi-dimensional keyword string). This highly resolved view of a user's behavior enables the Home Dot application 200 to source a very targeted offering (commerce opportunity or ad) and/or enable Dot developers to do the same. In one embodiment, the Home Dot application 200 supports a DMA message (pay to access) that provides Dot developers with access to this type of information (e.g., SendMessage "#system" "#get-use-context-string")

The Home Dot application 200 supports a developer toolkit service that sources ads targeted according to this multi-dimensional use context generated by the Home Dot application 200 (more targeted than currently possible with singular contexts such as text strings, e.g., searched on "toys"=serve a toy ad). The Home Dot application 200 and/or Dot application server 153 monitors/tracks, and handles incremental billing for all parties (e.g., anonymously).

Variations

Many variations on the above description are contemplated and within the scope of the present disclosure. For example, in an alternate embodiment, the Home Dot application 200 interface is implemented entirely as Dot content served from Dot application server 153. Furthermore, the Home Dot application 200 itself may be packaged as a Dot. The Home Dot application Dot has special responsibilities and rights, but otherwise, it could be as much a Dot as any other Dot. This embodiment enables the application executable to be significantly smaller and the Home Dot application 200 UI to be significantly more flexible.

In yet another alternate embodiment, the Home Dot application 200 is implemented as a plug-in to the web browser.

In still another alternate embodiment, the Home Dot application 200 is implemented in Java, thus enabling it to be more easily portable to other platforms.

Additionally, in another embodiment, a subset of the Home Dot application 200 functionality is implemented through the browser using pop-ups; this would be particularly valuable to mobile Home Dot application 200 users who don't always have easy access to a computer with the Home Dot application 200 installed.

The present invention enables the definition of an interface that groups Dots together from different content providers and offers them to end users as part of a unique system of content. Content from different internet companies can be made to interact with each other using aspects of the present invention provided for in the Dot messaging architecture (DMA). The Dot server 153 may therefore be provided with functionality to broker these relationships and facilitate this interaction in Internet content between companies and between Dot-enabled internet sites.

Because Dots can work together (via DMA and packs), the present invention enables companies or content providers to enable their Dots to work together. The present invention provides for another layer built upon the DMA API (application programming interface) that specifies how different kinds and types of Dots from different companies or developers communicate/work together. This layer is optionally open source so that a large portion of it is self-published by the Dot Developers themselves.

Dot Developers implement, specify, and publish in a database DMA message methods that other Dot Developers implement through calls made within their published Dots. These Dot developer methods may be aggregated and published for use in a database provided by the Home Dot publisher for example and sourced within a developer zone, or as part of a Dot Definition.

Dot developers may implement these DMA message methods as Java script functions that other Dot Developers calls with the DMA's ##<any Javascript> message. Dot Developers would need to be able to address a particular Dot's Web Conduit control that supports a page implementing the specified Javascript function and address by domain if different from their domain. Restricted or variable permissions may be provided via a web server or defined in a Dot's Dot Definition to restrict/enable routing of messages.

A Dot Developer has the option to restrict access to certain methods according to some criteria e.g., public, partners, domain. Different types of restriction criteria schemes may be implemented. A Dot may send a message to another Dot and query for methods accessible to it. An example of access levels for functions is provided below.

Public functions—Dot Developer implements and publishes DMA message methods that any other Dot Developer could call (e.g., what-time-is-it for a Clock Dot).

Reserved functions—Dot Developer implements, specifies, and publishes a set of DMA message methods that may be called only by certain types of Dot Developers (e.g. premier partner), specific Dot Developers, or specific Dots.

Private functions within the same domain—A Dot Developer restricts access to certain DMA message methods that may only be implemented by other Dots in the same domain. The preferred embodiment provides for the option to either allow all messages to flow between domains, or to fully restrict messages to within a domain.

Local Private functions within Dot—At the most restricted level, access is specified such that DMA messages may only be accessed from within the same Dot.

A published API that specifies ways for Dots to extend functionality to other Dots enables Dot Developers to leverage the development work and functionality of other Dots. As an example, a Dot Developer may implement a credit card processing Dot. In one embodiment, this Dot is implemented as a javascript function that checks the credit available on a credit card. This developer could specify this as a public function (in the Dot Definition for example) and publish this function in a Server Dot Index. Other Dot Developers send a message to this Dot and call "check-credit", thus leveraging the development carried out from the first Dot Developer.

In the above example, the messaging architecture may provide revenue generation by way of monthly fees, per-access fees, etc. The Home Dot application 200 and/or Dot application servers could monitor/track and automatically handle incremental billing for all parties. By applying this method to the previous example, a Dot Developer who calls a credit card processing Dot for a credit check may be incrementally billed for each such call.

It will be appreciated that the methods, in the form of instructions having a sequence, syntax, and content, of the present invention may be stored on (or equivalently, in) any of a wide variety of computer-readable media such as magnetic media, optical media, magneto-optical media, electronic media (e.g., solid state ROM or RAM), etc., the form of which media not limiting the scope of the present invention. A data processor reading said media is operable to either transfer (e.g., download) said instructions thereto and then operate on those instructions, or cause said instructions to be read from the media and operate in response thereto. Furthermore, devices (e.g., a reader) for accessing the instructions on said media may be contained within or connected directly to the data processor residing on a device on which those instructions operate, or may be connected via a network or other communication pathway to said data processor.

While a plurality of preferred exemplary embodiments have been presented in the foregoing detailed description, it should be understood that a vast number of variations exist, and these preferred exemplary embodiments are merely representative examples, and are not intended to limit the scope, applicability or configuration of the invention in any way. Rather, the foregoing detailed description provides those of ordinary skill in the art with a convenient guide for implementation of the invention, by way of examples, and contemplates that various changes in the functions and arrangements of the described embodiments may be made without departing from the spirit and scope of the invention defined by the claims thereto.

What is claimed is:

1. A client device, the client device comprising:
   electronic storage having stored thereon a plurality of networked information monitor templates defining a plurality of networked information monitors, the plurality of networked information monitor templates comprising a first networked information monitor template defining a first networked information monitor, wherein the first networked information monitor template comprises:
   (1) a content reference that comprises a network location at which content for the first networked information monitor is accessible via a TCP/IP protocol;
   (2) a definition of a graphical user interface of the first networked information monitor that lacks controls for manually navigating a network, and that includes a frame within which content received from the network location can be displayed, and frame characteristics defining one or more a color, a size, or a position on the electronic display of the frame; and
   (3) instructions configured (i) to cause the first networked information monitor to request content from the network location in the content reference via the TCP/IP protocol, and (ii) to cause the first networked information monitor to generate the graphical user interface of the first networked information monitor with the content received from the network location via the TCP/IP protocol within the frame;
   an electronic display; and
   one or more processors configured to access the first networked information monitor template, and to execute the first networked information monitor template such that the graphical user interface of the first networked information monitor is presented to a user on the electronic display having content received from the content reference therein.

2. The client device of claim 1, wherein the first networked information monitor template further comprises control characteristics that define one or more controls that are usable by the user to interact with or control the first networked information monitor.

3. The client device of claim 2, wherein the control characteristics define visual representations of the controls that are included in the graphical user interface of the first networked information monitor.

4. The client device of claim 1, wherein the plurality of networked information monitor templates further comprises a second networked information monitor template defining a second networked information monitor, wherein the second networked information monitor template comprises:
   (1) a second content reference that comprises a second network location, which is different from the network location in the content reference of the first networked information monitor template, at which content for the second networked information monitor is accessible via the TCP/IP protocol; and
   (2) a definition of a graphical user interface of the second networked information monitor that lacks controls for manually navigating a network, and that includes a second frame within which content received from the second network location can be displayed; and
   (3) instructions configured (i) to cause the second networked information monitor to request content from the second network location in the second content reference via the TCP/IP protocol, and (ii) to cause the second networked information monitor to generate the graphical user interface of the second networked information monitor with the content received from the second network location via the TCP/IP protocol within the frame.

5. The client device of claim 4, wherein the one or more processors are further configured to execute the second networked information monitor template such that the graphical user interface of the second networked information monitor is presented to the user on the electronic display separately and discretely from the user interface of the first networked information monitor, and having content therein received from the second content reference.

6. The client device of claim 1, wherein the one or more processors are further configured to transmit a request to a server for a further networked information monitor template responsive to reception of a user request for a further networked information monitor defined by the further networked information monitor template.

7. The client device of claim 6, wherein the electronic storage is configured to electronically store the received further networked information monitor template, responsive to reception of the further networked information monitor template from the server.

8. The client device of claim 7, wherein the one or more processors are further configured to execute the further networked information monitor template.

9. A computer-implemented method of presenting Internet content to a user, the method being implemented in a client device comprising a electronic storage, an electronic display, and one or more processors, the method comprising:

storing to the electronic storage a plurality of networked information monitor templates defining a plurality of networked information monitors, the plurality of networked information monitor templates comprising a first networked information monitor template defining a first networked information monitor, wherein the first networked information monitor template comprises:

(1) a content reference that comprises a network location at which content for the first networked information monitor is accessible via a TCP/IP protocol; and (2) a definition of a graphical user interface of the first networked information monitor that lacks controls for manually navigating a network, and that includes a frame within which content received from the network location can be displayed, and frame characteristics defining one or more a color, a size, or a position on the electronic display of the frame; and (3) instructions configured (i) to cause the first networked information monitor to request content from the network location in the content reference via the TCP/IP protocol, and (ii) to cause the first networked information monitor to generate the graphical user interface of the first networked information monitor with the content received from the network location via the TCP/IP protocol within the frame;

accessing the first networked information monitor template in the electronic storage; and executing the first networked information monitor template on the one or more processors such that the graphical user interface of the first networked information monitor is presented to the user on the electronic display having therein content received from the content reference.

10. The method of claim 9, wherein the first networked information monitor template further comprises control characteristics that define one or more controls that are usable by the user to interact with or control the first networked information monitor.

11. The method of claim 10, wherein the control characteristics define visual representations of the controls that are included in the graphical user interface of the first networked information monitor.

12. The method of claim 9, wherein the plurality of networked information monitor templates further comprises a second networked information monitor template defining a second networked information monitor, wherein the second networked information monitor template comprises:

(1) a second content reference that comprises a second network location, which is different from the network location in the content reference of the first networked information monitor template, at which content for the second networked information monitor is accessible via the TCP/IP protocol; and (2) a definition of a graphical user interface of the second networked information monitor that lacks controls for manually navigating a network, and that includes a second frame within which content received from the second network location can be displayed; and (3) instructions configured (i) to cause the second networked information monitor to request content from the second network location in the second content reference via the TCP/IP protocol, and (ii) to cause the second networked information monitor to generate the graphical user interface of the second networked information monitor with the content received from the second network location via the TCP/IP protocol within the frame.

13. The method of claim 12, further comprising executing the second networked information monitor template on the one or more processors such that the graphical user interface of the second networked information monitor is presented to the user on the electronic display separately and discretely from the user interface of the first networked information monitor, and having content therein received from the second content reference.

14. The method of claim 9, further comprising transmitting a request to a server for a further networked information monitor template responsive to reception of a user request for a further networked information monitor defined by the further networked information monitor template.

15. The method of claim 14, further comprising, responsive to reception of the further networked information monitor template from the server, storing the received further networked information monitor template to the electronic storage.

16. The method of claim 15, further comprising executing the further networked information monitor template on the one or more processors.

* * * * *

UNITED STATES PATENT AND TRADEMARK OFFICE
CERTIFICATE OF CORRECTION

| | | |
|---|---|---|
| PATENT NO. | : 8,020,083 B1 | Page 1 of 1 |
| APPLICATION NO. | : 11/932585 | |
| DATED | : September 13, 2011 | |
| INVENTOR(S) | : John Albert Kembel et al. | |

It is certified that error appears in the above-identified patent and that said Letters Patent is hereby corrected as shown below:

On the Title page, Item (63) should read:

(63)  Continuation of application No. 09/558,922, filed on Apr. 26, 2000, now Pat. No. 7,756,967, and application No. 09/558,925, filed on Apr. 26, 2000, now Pat. No. 7,660,868.

On the Title page, insert Item (60) as follows:

-- (60)  Provisional application No. 60/131,083, filed on Apr. 26, 1999, provisional application No. 60/131,115, filed on Apr. 26, 1999, provisional application No. 60/131,114, filed on Apr. 26, 1999, provisional application No. 60/176,687, filed on Jan. 18, 2000, provisional application No. 60/176,699, filed on Jan. 18, 2000. --

Signed and Sealed this
Fourth Day of September, 2012

David J. Kappos
*Director of the United States Patent and Trademark Office*